(12) United States Patent
Igelka

(10) Patent No.: US 8,838,830 B2
(45) Date of Patent: Sep. 16, 2014

(54) OPTIMIZING DISTRIBUTED COMPUTER NETWORKS

(75) Inventor: Or Igelka, Ramat Gen (IL)

(73) Assignee: SAP Portals Israel Ltd, Ra'anana (IL)

( * ) Notice: Subject to any disclaimer, the term of this patent is extended or adjusted under 35 U.S.C. 154(b) by 967 days.

(21) Appl. No.: 12/902,330

(22) Filed: Oct. 12, 2010

(65) Prior Publication Data

US 2012/0089664 A1 Apr. 12, 2012

(51) Int. Cl.
| | | |
|---|---|---|
| G06F 15/173 | (2006.01) | |
| G06F 9/50 | (2006.01) | |
| H04L 12/707 | (2013.01) | |
| H04L 12/24 | (2006.01) | |
| H04L 29/08 | (2006.01) | |

(52) U.S. Cl.
CPC ............... *G06F 9/5083* (2013.01); *H04L 45/22* (2013.01); *H04L 41/0883* (2013.01); *H04L 67/1031* (2013.01)
USPC ........... 709/239; 709/203; 709/204; 709/220; 709/224; 370/255

(58) Field of Classification Search
CPC ....... H04L 43/16; H04L 43/04; H04L 43/045; H04L 2012/5623; H04L 45/22
USPC .................. 709/203, 204, 224, 239
See application file for complete search history.

(56) References Cited

U.S. PATENT DOCUMENTS

| | | |
|---|---|---|
| 5,590,321 A | 12/1996 | Lin et al. |
| 5,832,511 A | 11/1998 | Beck et al. |
| 5,848,243 A | 12/1998 | Kulkarni et al. |
| 6,272,529 B1 | 8/2001 | Lum |
| 6,278,718 B1 | 8/2001 | Eschholz |
| 6,412,016 B1 | 6/2002 | Martin et al. |
| 6,477,572 B1 | 11/2002 | Elderton et al. |
| 6,546,415 B1 | 4/2003 | Park |
| 6,909,700 B1 | 6/2005 | Benmohamed et al. |
| 7,020,145 B1 | 3/2006 | Symons et al. |
| 7,103,629 B2 | 9/2006 | Chen |
| 7,113,900 B1 | 9/2006 | Hunt et al. |
| 7,277,876 B2 | 10/2007 | Solomon |
| 7,389,303 B2 | 6/2008 | Verma et al. |
| 7,409,634 B2 | 8/2008 | Davis et al. |
| 7,441,191 B2 | 10/2008 | Pfahlmann et al. |
| 7,469,287 B1 | 12/2008 | Castillo et al. |
| 7,483,424 B2 | 1/2009 | Jain et al. |
| 7,496,648 B2 | 2/2009 | Manion et al. |
| 7,505,995 B2 | 3/2009 | Grealish et al. |
| 7,509,540 B1 | 3/2009 | Lovy et al. |

(Continued)

FOREIGN PATENT DOCUMENTS

WO WO2009042919 4/2009

OTHER PUBLICATIONS

Nagios, "Netways" demo, http://nagios.demo.netways.de/, last visited Oct. 11, 2009 (2 pages).

*Primary Examiner* — Glenford Madamba
(74) *Attorney, Agent, or Firm* — Fish & Richardson P.C.

(57) ABSTRACT

In one general embodiment, a computer-implemented method for managing a distributed computer network performed by one or more processors includes the steps of: receiving a request from a client in the distributed computer network for a network service; optimizing a delivery of the requested network service to the client from a server in the distributed computer network; and monitoring an execution of the delivery of the network service.

33 Claims, 17 Drawing Sheets

(56) References Cited

U.S. PATENT DOCUMENTS

| | | |
|---|---|---|
| 7,523,094 B1 | 4/2009 | Thiemann et al. |
| 7,523,220 B2 | 4/2009 | Tan et al. |
| 7,822,695 B2 * | 10/2010 | Solomon .................. 706/14 |
| 8,422,379 B2 * | 4/2013 | Xu et al. .................. 370/248 |
| 2008/0247320 A1 | 10/2008 | Grah et al. |
| 2008/0273462 A1 | 11/2008 | Klish |
| 2009/0259543 A1 | 10/2009 | Farnham et al. |
| 2009/0292629 A1 | 11/2009 | Lynch et al. |
| 2009/0292824 A1 | 11/2009 | Marashi et al. |
| 2010/0005478 A1 | 1/2010 | Helfman et al. |
| 2010/0023923 A1 | 1/2010 | Shribman et al. |
| 2010/0030896 A1 | 2/2010 | Chandramouli et al. |
| 2010/0049851 A1 | 2/2010 | Garrison et al. |
| 2010/0061719 A1 | 3/2010 | Monga et al. |
| 2010/0205292 A1 | 8/2010 | Diaz |
| 2010/0223364 A1 * | 9/2010 | Wei .................. 709/220 |
| 2010/0235843 A1 | 9/2010 | Appa et al. |

* cited by examiner

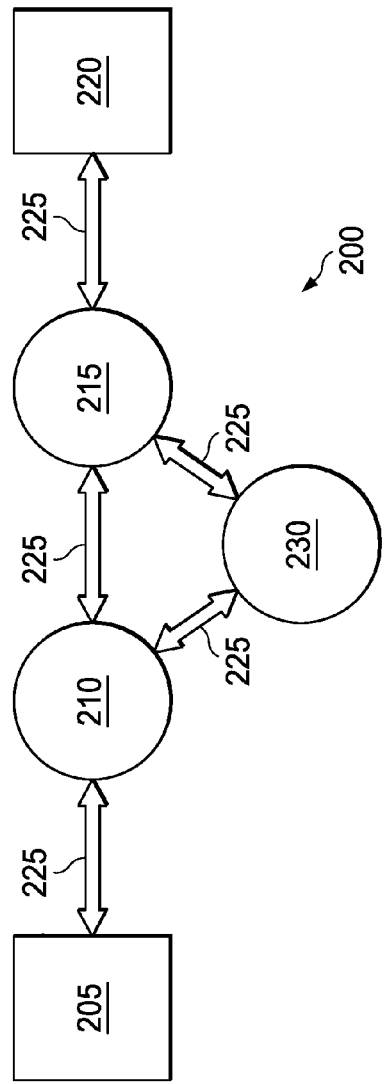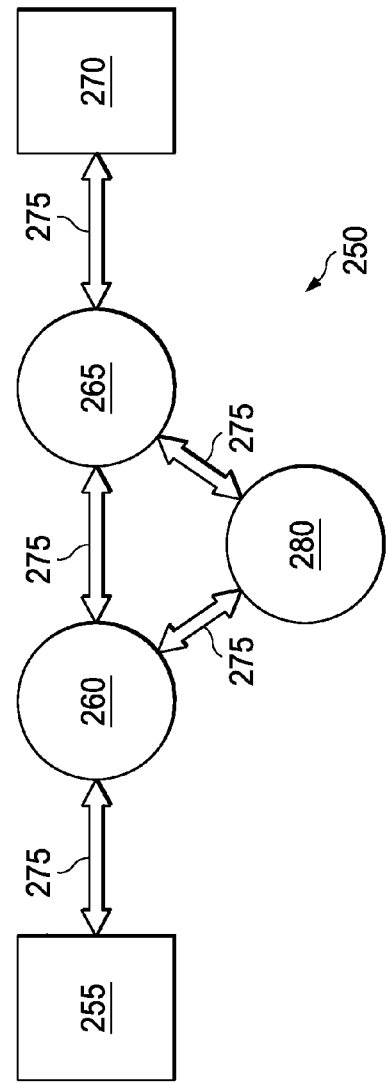

| INSTANCE ID | SERVICE | SERVICE TYPE | CURRENT STATUS | BYPASS | ACCESS POINT (VIRTUAL ADDRESS) | CONNECT POINT (REAL ADDRESS) | AVAILABILITY | AVAILABILITY HISTORY | MTBF |
|---|---|---|---|---|---|---|---|---|---|
| 602 | 604 | 606 | 608 | 610 | 612 | 614 | 616 | 618 | 624 |
| 11500 | NETWORK SERVICE 1 | myhttp | Up | ☐ | 172.16.215.23:80 | 10.26.124.18:80 | 96.71% | LOG  GRAPH  620  622 | 2 HOURS 37 MINUTES |
| 11500 | NETWORK SERVICE 2 | myhttp | Up | ☐ | 172.16.215.22.10:80 | 172.16.60.21:80 | 84.01% | LOG  GRAPH | 5 HOURS 3 SECONDS |

Availability Log

Network Service 1

| Status | Date & Time |
|---|---|
| Up | Mon, 09 Aug 2010 11:30:02 GMT |
| Down | Mon, 09 Aug 2010 10:27:13 GMT |
| Up | Mon, 09 Aug 2010 10:24:02 GMT |
| Down | Mon, 09 Aug 2010 10:21:52 GMT |
| Up | Mon, 09 Aug 2010 05:26:53 GMT | displaying all 5

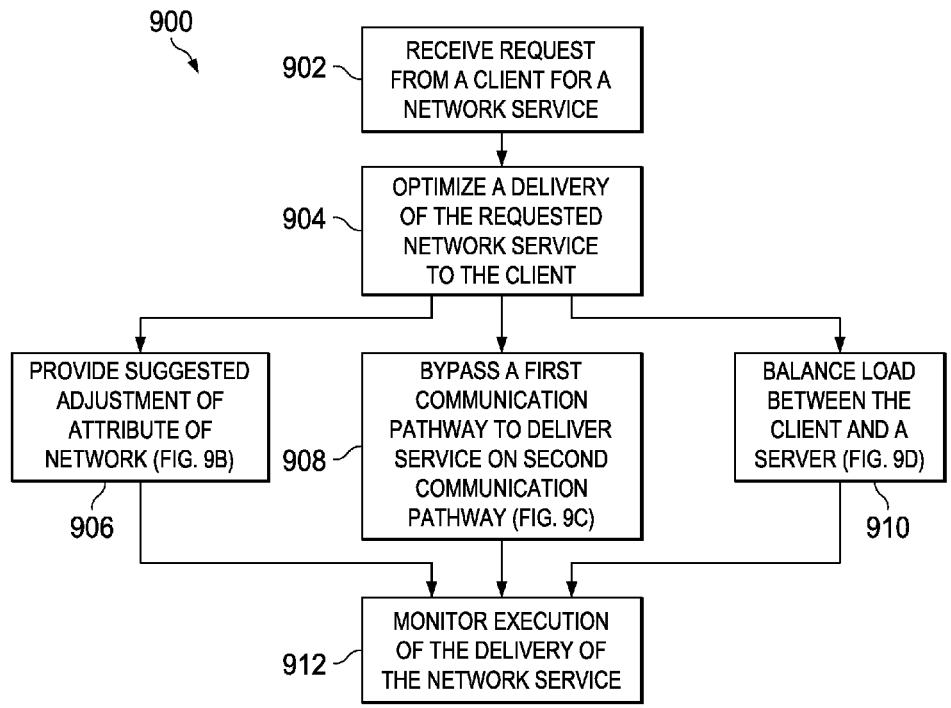
FIG. 9A
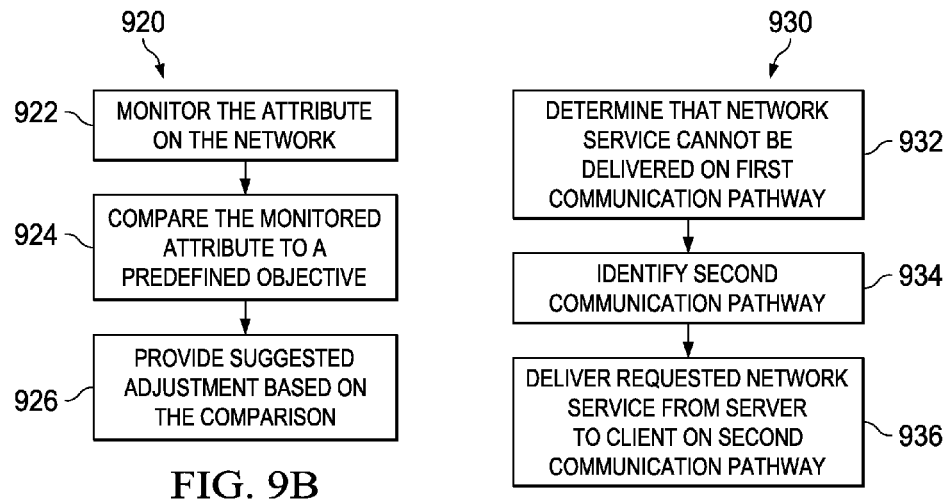
FIG. 9B
FIG. 9C

OPTIMIZING DISTRIBUTED COMPUTER NETWORKS

TECHNICAL BACKGROUND

This disclosure relates to optimizing distributed computer networks and, more particularly, to optimizing and monitoring distributed computer networks utilizing an optimizing engine installed on front ends of a client and a server in the distributed network.

BACKGROUND

Network services, such as web services, email, streaming media, or other services or applications provided by a server to a client via a network, have become widespread since the advent of distributed networks. As network services become more complex and consume more resources (i.e., bandwidth, memory, and the like), however, the distributed network may not be able to provide or handle the delivery of such services in an efficient and expeditious manner. In addition, whether any particular network service is being provided in an efficient and expeditious manner may not be known or easily discoverable by a system administrator tasked to ensure that the network service is being properly provided. In order to ensure that this task is properly completed, various software modules, or software engines, may monitor the delivery of network services. Other software modules, or engines, may accelerate the delivery of network services through a variety of different techniques.

SUMMARY

In one general embodiment, a computer-implemented method for managing a distributed computer network performed by one or more processors includes the steps of: receiving a request from a client in the distributed computer network for a network service; optimizing a delivery of the requested network service to the client from a server in the distributed computer network; and monitoring an execution of the delivery of the network service.

In one or more aspects of the general embodiment, the step of optimizing a delivery of the requested network service to the client from the server may include at least one of: balancing a load between the client and the server in the distributed computer network; bypassing a first communication pathway between the client and the server to deliver the requested network service via a second communication pathway between the client and the server; providing a suggested adjustment of at least one attribute of the distributed computer network to an administrator of the network; and automatically applying a dynamic adjustment to the distributed computer system.

In one or more aspects of the general embodiment, providing a suggested adjustment of at least one attribute of the distributed computer network to an administrator of the network may include: monitoring the at least one attribute of the distributed computer network; comparing the monitored attribute to at least one predefined objective; and based on the comparison, providing the suggested adjustment of the distributed computer network to the administrator of the network In one or more aspects of the general embodiment, the at least one attribute is a measurement of the delivery of the requested network service.

In one or more aspects of the general embodiment, the suggested adjustment may include at least one of: a suggestion to add a node to the distributed computer network; a suggestion to add a new communication pathway between at least two existing nodes in the distributed computer network; and a suggestion to add a new network service available on the distributed computer network; a suggestion to modify an existing network service available on the distributed computer network; a suggestion to adjust a variable related to the first communication pathway; a suggestion to remove one or more nodes from the distributed computer network; a suggestion to remove one or more communication pathways from the distributed computer network; and a suggestion to remove one or more network services from the distributed computing network.

In one or more aspects of the general embodiment, comparing the monitored attribute to at least one predefined objective may include: defining an objective function comprising at least one variable representative of the distributed computer network; defining at least one constraint on the variable; and solving the objective function to determine a value of the variable within the constraint.

In one or more aspects of the general embodiment, solving the objective function to determine a value of the variable within the constraint may include: solving one of a minimization or a maximization of the objective function to determine the value of the variable within the constraint.

In one or more aspects of the general embodiment, solving the objective function to determine a value of the variable within the constraint may include: solving the objective function to determine a value of the variable within the constraint using at least one of a linear programming algorithm and an integer programming algorithm.

In one or more aspects of the general embodiment, bypassing a first communication pathway between the client and the server to deliver the requested network service via a second communication pathway between the client and the server may include: determining that the requested network service stored on the server cannot be delivered through the first communication pathway; identifying the second communication pathway between the client and the server; and delivering the requested network service from the server to the client via the second communication pathway.

One or more aspects of the general embodiment may further include: identifying an event in the distributed computer network on the first communication pathway, the event communicably decoupling the client and the server within the first communication pathway; determining the second communication pathway between the client and the server that does not include the event; and establishing the second communication pathway between the client and the server.

One or more aspects of the general embodiment may further include: determining that the identified event is within a predefined class of events; identifying a predefined responsive action associated with the predefined class of events; and initiating the predefined responsive action.

In one or more aspects of the general embodiment, the responsive action may include at least one of: establishing the second communication pathway between the client and the server; notifying an administrator of the distributed computer network of the identified event; establishing a third communication pathway between the client and a second server; and providing a suggestion to the administrator to add a fourth communication pathway.

One or more aspects of the general embodiment may further include: in response to the provided suggestion, receiving a command to establish the fourth communication pathway; and establishing the fourth communication pathway between the client and the server in the distributed computer network.

One or more aspects of the general embodiment may further include: subsequent to establishing the second communication pathway between the client and the server, determining that the event is completed such that the client and the server are communicably coupled within the first communication pathway; receiving a second request from the client in the distributed computer network for the network service; and delivering the requested network service to the client from the server via the first communication pathway.

In one or more aspects of the general embodiment, balancing a load between the client and the server in the distributed computer network may include: monitoring the load on a first node in the distributed computer network between the client and the server, where the load is associated with delivery of network services through the first node; determining that the load exceeds a predetermined threshold; and delivering the requested network service from the server to the client through a second node distinct from the first node.

In one or more aspects of the general embodiment, balancing a load between the client and the server in the distributed computer network may include: balancing a load between two or more communication pathways in the distributed computer network.

In one or more aspects of the general embodiment, balancing a load between two or more communication pathways in the distributed computer network may include: monitoring a first load on a first communication pathway between the client and the server; monitoring a second load on a second communication pathway between the client and the server, the first and second loads associated with delivery of network services on the respective first and second communication pathways; determining that the first load exceeds the second load; and based on the determination, delivering the requested network service from the server to the client via the second communication pathway.

In one or more aspects of the general embodiment, the first communication pathway may include a first server communicably coupled to a first server front end that is communicably coupled to the client; and the second communication pathway may include the first server communicably coupled to a second server front end that is communicably coupled to the client, such that delivering the requested network service from the server to the client via the second communication pathway may include delivering at least a portion of the requested network service from the first server to the client through the second server front end.

One or more aspects of the general embodiment may further include: delivering another portion of the requested network service from the first server to the client through the first server front end substantially simultaneous to delivering the portion of the requested network service from the first server to the client through the second server front end.

In one or more aspects of the general embodiment, the first communication pathway may include a first server communicably coupled to a first server front end that is communicably coupled to the client; and the second communication pathway may include a second server communicably coupled to the first server front end that is communicably coupled to the client, such that delivering the requested network service from the server to the client via the second communication pathway may include delivering at least a portion of the requested network service from the second server to the client through the first server front end.

One or more aspects of the general embodiment may further include: delivering another portion of the requested network service from the first server to the client through the first server front end substantially simultaneous to delivering the portion of the requested network service from the second server to the client through the first server front end.

In one or more aspects of the general embodiment, monitoring an execution of the delivery of the network service may include: monitoring, in real-time, a plurality of attributes associated with the execution of the delivery of the network service; and graphically presenting at least one of the plurality of monitored attributes to an administrator of the distributed computing network.

In one or more aspects of the general embodiment, monitoring an execution of the delivery of the network service may include: routing the request to a first node in the distributed computer network, where the first node includes a first optimizing engine operable to monitor delivery and execution of the requested network service and display a first group of data associated with the delivery and execution of the requested network service through a first user interface; routing the request to a second node in the distributed computer network, where the second node includes a second optimizing engine operable to monitor delivery and execution of the requested network service and display a second group of data associated with the delivery and execution of the requested network service through a second user interface. the second group of data different than the first group of data; and synchronizing the first optimizing engine with the second optimizing engine such that data displayed on the first user interface matches data displayed on the second user interface.

One or more aspects of the general embodiment may further include: identifying a first configuration of the first node; identifying a second first configuration of the second node; and synchronizing the first optimizing engine with the second optimizing engine such that the first and second configurations are substantially identical.

In one or more aspects of the general embodiment, the dynamic adjustment to the distributed computer system includes at least one of: adding a node to the distributed computer network; adding a new communication pathway between at least two existing nodes in the distributed computer network; and adding a new network service available on the distributed computer network; modifying an existing network service available on the distributed computer network; adjusting a variable related to the first communication pathway; removing one or more nodes from the distributed computer network; removing one or more communication pathways from the distributed computer network; and removing one or more network services from the distributed computing network.

One or more aspects of the general embodiment may further include: notifying an administrator of the distributed computing system of the dynamic adjustment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes at least a server including one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

Various embodiments of and including an optimizing engine used in a distributed computing environment may include one or more of the following advantages. For example, the optimizing engine may create configurations of services, save various data, validate information in-memory during run-time, and as a base for a communication protocol between a network service provider and a network service consumer. The optimizing engine may also uniformly apply the provided services' configurations at all of the network service providers and consumers, while synchronizing the service providers and service consumers. The optimizing engine may also allow real-time monitoring of individual network services, groups of network services, individual links between nodes in a network, a network as a whole, and validation of a network service as a whole, as well as parts of a network service. The optimizing engine may also provide automatic, pre-defined responses according to a virtual state machine of network services (as well as modeled objects representing the services) with no manual intervention. For example, alerts, events and notifications can be sent to various logging elements. The optimizing engine may also automatically and/or manually bypass a network service or connection between service providers and service consumers that is unavailable. The optimizing engine may also provide real-time service monitor user interface for service providers and service consumers, as well as, at a central management unit.

Various embodiments of and including an optimizing engine used in a distributed computing environment may also include one or more of the following advantages. For example, the optimizing engine may automatically update user interfaces at network service providers and/or network service consumers with real-time live status and data of network services in the distributed system, without any manual intervention, or a need of a discovery system. The optimizing engine's service monitor, or user interface, may collect and display data from network services and statistical analysis of the data. The optimizing engine may also allow modification of network service configurations and parameters while monitoring of the network services and/or service delivery continues. The optimizing engine may also accelerate network services and applications and provide suggestions to a system administrator designed to increase flexibility, efficiency, and acceleration of tasks performed by the distributed environment. For instance, the suggestions mechanism may allow administrators to achieve their goals and to plan their network topology and their network services effectively according to an objective functions and constraints they can define and parameters they can configure, such as cost, number of computing devices in the system, performance of the network, and otherwise. The optimizing engine allows administrators to define administrative roles and permissions for other administrators, allowing them to switch roles when configuring all or part of the distributed network. The optimizing engine may also load balance between network service providers and network service consumers in a distributed environment, while giving priorities, for example, to particular network services, service providers, service consumers, and otherwise.

The optimizing engine may also allow or provide for a system administrator to set priorities to services, define Quality of Service (QoS) for network services, and define responses, handlers, and notifications sending to various targets, when pre-defined events occur. The optimizing engine may also rely on static parameters such as routers locations, servers location, and link capacities, but also use parameters such as dynamic load on nodes in the distributed network topology, bandwidth of each link, latency between nodes, the status of each link (up/down), and otherwise. In other words, the optimizing engine may provide for the dynamic optimization of the distributed environment's performance by, for example, facilitating dynamic load balancing between nodes (e.g., network service providers and consumers) in the network. The optimizing engine may also facilitate observation of the distributed network status both as a whole and as a combination of network services, so that automatic dynamic adjustments for optimizations take into consideration finer-grained parameters, working at a higher level of optimization capabilities. Thus, the optimizing engine may optimize both the performance of the network as a whole, and the performance of each network service, according to the network's live status and properties, and according to the network services' live status and configurations. For example, the priorities can be set per network service, or per group of network services, and these parameters can be taken into consideration when performing dynamic optimization adjustments.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIGS. 2A-B illustrate topological representations of example distributed computing systems including an optimizing engine according to the present disclosure;

FIGS. 6A-D illustrate example service monitor user interfaces of an optimizing engine used in a distributed computing system according to the present disclosure;

FIGS. 9A-E illustrate example processes that may be performed by one or more optimizing engines in a distributed computing system according to the present disclosure.

DETAILED DESCRIPTION

In some example embodiments, a distributed computing system including an optimizing engine may relate to: monitoring and controlling, central management, object oriented modeling, modeled objects, data synchronization, real-time status, information and data (on demand), network services, application delivery, client-server communication, network acceleration, service monitoring, monitoring in general, network configurations, configuration modifications, configuration and content validation, UI utilities, data collecting, statistical analysis, response automation, bypass of services, notifications, alerts, events, Quality of Service (QoS), load balancing, network administration, performance optimization, automatic recovery, distributed computer networks, network topology; linear and/or integer programming; system modeling; and cloud computing.

Figure 1:
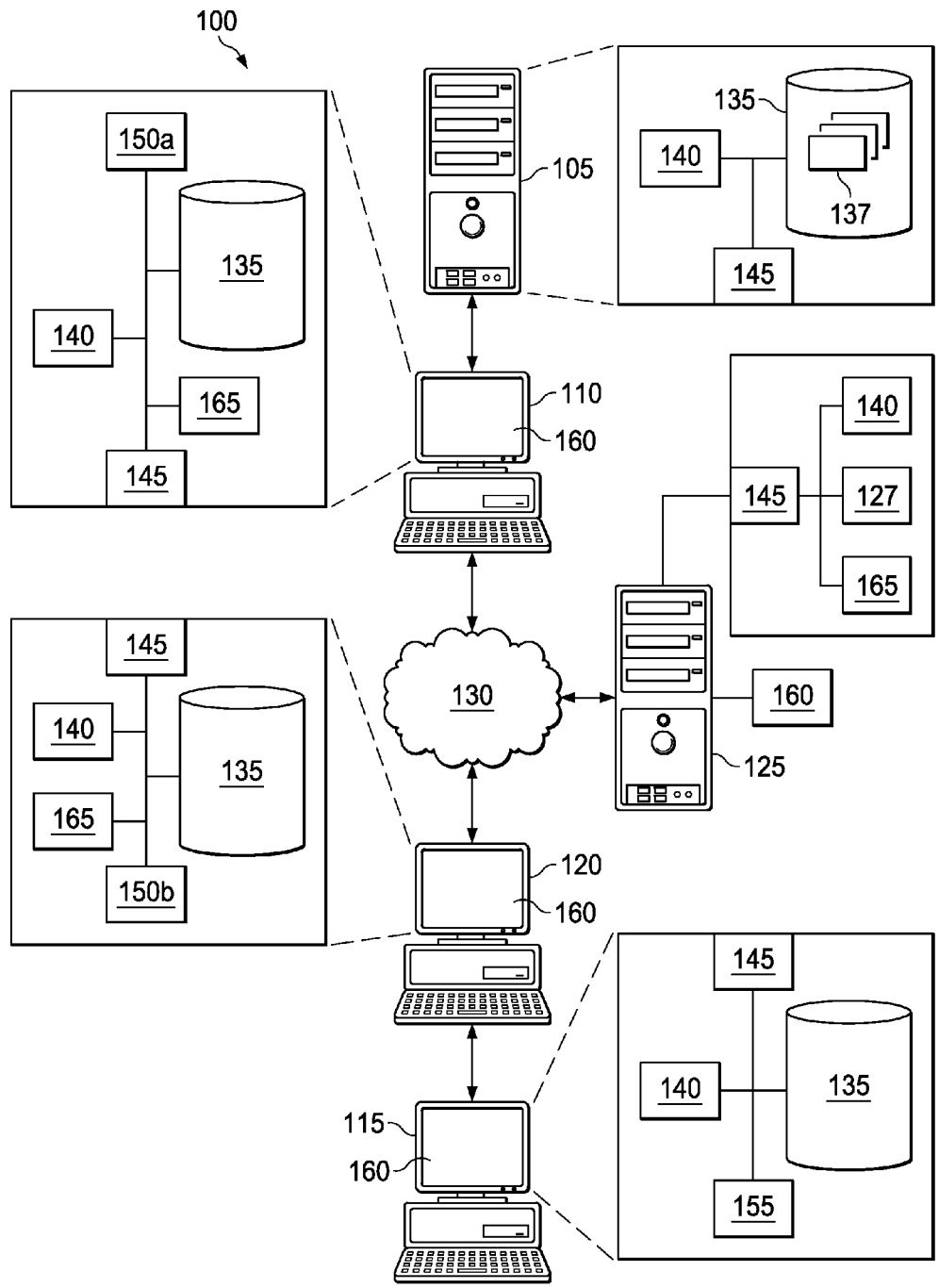
FIG. 1 illustrates one example embodiment of a distributed computing system including an optimizing engine according to the present disclosure.

FIG. 1 illustrates one example embodiment of a distributed computing system 100 including an optimizing engine 150a and 150b configured on certain components of the system 100. Generally, the system 100 including optimizing engine 150a and 150b may be optimized through, for example, network load balancing, network synchronization among one or more components, automatic or manual bypass of one or more links and/or nodes within the system 100, as well as other techniques described in more detail below. The illustrated computing system 100 includes a real server 105, a server front end ("SFE") 110, a client 115, a client front end ("CFE") 120, and a repository 125, each of which are communicably coupled within the system 100 by a network 130.

The real server 105, at a high level, is a provider of network services to, for example, the client 115, other clients, as well as other systems, users, or other devices communicably coupled or integrated within the system 100. As used herein, "network service" may be any service and/or any type of service provided by a server (such as real server 105) to a client (such as client 115) via a network (such as network 130), and any network-based application, such as but not limited to: Web Service, TCP (Transmission Control Protocol) Service, UDP (User Datagram Protocol) Service, FTP (File Transfer Protocol) Service, POP (Post Office Protocol) Service, DNS (Domain Name System) Service, DHCP (Dynamic Host Configuration Protocol) Service, NFS (Network File Sharing/Network File System) Service, SNMP (Simple Network Management Protocol) Service, HTTP (Hypertext Transfer Protocol) Service, HTTPS (Secure Hypertext Transfer Protocol) Service, ODBC (Open Database Connectivity) Service, DB (Database) Service, SMTP (Simple Mail Transport Protocol) Service, Email Service, Authentication Server Service, Directory Service, VoIP (Voice over IP) Service, Multimedia Service, Streaming Media Service, RDP (Remote Desktop Connection) Service, Printer Service, and other network services.

In general, the real server 105 is any server that stores network services 137 and, for example, one or more hosted applications, where at least a portion of the hosted applications are executed via requests and responses sent to users or clients within and communicably coupled to the illustrated system 100. For example, in some embodiments, the hosted application on server 105 may facilitate or help facilitate the provision of network services 137 to one or more clients, such as client 115. In some instances, the server 105 may store a plurality of various hosted applications, while in other instances, the server 105 may be a dedicated server meant to store and execute only a single hosted application. In some instances, the server 105 may comprise a web server, where the hosted applications represent one or more web-based applications accessed and executed via network 130 by the clients 115 of the system to perform the programmed tasks or operations of the hosted application. At a high level, the server 105 comprises an electronic computing device operable to receive, transmit, process, store, or manage data and information associated with the system 100.

Although FIG. 1 illustrates a single server 105, system 100 can be implemented using two or more servers 105, as well as computers other than servers, including a server pool. Indeed, server 105 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 105 may be adapted to execute any operating system, including Linux, UNIX, Windows, Mac OS, or any other suitable operating system. According to one embodiment, server 105 may also include or be communicably coupled with a mail server.

SFE 110, in the illustrated embodiment, is an appliance (e.g., computing device) that may consume network services 137 from server 105 and provide CFE 120 with the network services 137 it consumes. For example, SFE 110 may act as a type of a reflector of the network services 137 it consumes. Further, the SFE 110 can consume network services 137 from several different servers. In the illustrated embodiment, SFE 110 is any computing device operable to connect to or communicate with at least the server 105 and/or via the network 130 using a wireline or wireless connection. In general, each SFE 110 comprises an electronic computer device operable to receive, transmit, process, and store any appropriate data associated with the system 100 of FIG. 1. It will be understood that there may be any number of SFEs 110 associated with, or external to, system 100. Additionally, there may also be one or more additional SFEs 110 external to the illustrated portion of system 100 that are capable of interacting with the system 100 via the network 130. Moreover, while each SFE 110 is described in terms of being used by a single user (e.g., system administrator), this disclosure contemplates that many users may use one computer, or that one user may use multiple computers.

As used in this disclosure, SFE 110 is intended to encompass a personal computer, touch screen terminal, workstation, network computer, kiosk, wireless data port, smart phone, personal data assistant (PDA), one or more processors within these or other devices, or any other suitable processing device. For example, each SFE 110 may comprise a computer that includes an input device, such as a keypad, touch screen, mouse, or other device that can accept user information, and an output device that conveys information associated with the operation of the server 105 (and any hosted applications) or the SFE 110 itself, including digital data, visual information, applications, and/or user interfaces. Both the input and output device may include fixed or removable storage media such as a magnetic storage media, CD-ROM, or other suitable media to both receive input from and provide output to users of the SFE 110 through the display, namely, a GUI 160.

SFE 110 may be specifically associated with an administrator of the illustrated environment 100. The administrator, in some embodiments, can modify various settings associated with one or more of the other SFEs, CFEs, repositories, the server 105 (and/or other servers), hosted applications, and/or any relevant portion of system 100. For example, the administrator can configure SFE 110 to include optimizing engine 150a illustrated in FIG. 1. For example, the system administrator associated with SFE 110 (or another administrator associated with another appliance) may set and/or configure, through the optimizing engine 150a: a local configuration of the SFE 110 (e.g., its IP, the IPs it will be listening on, its hostname, and otherwise); network services (e.g., which network service 137 may be consume by the SFE 110 and which service 137 may be provided by the SFE 110); an ability to manually configure the network service 137; an ability to automatically discover the network services 137 which are available in the network associated with the SFE 110 (e.g., the network services 137 that servers in the SFE 110's network, such as real server 105, provide); parameters of each network service 137 which is delivered to and by the SFE 110 (e.g., the IP that the service 137 is exposed on, the port the service 137 uses, the protocol (HTTP or HTTPS), the type of the service 137. and otherwise); an ability to automatically set values to the parameters; and an ability to manually edit the values of the parameters.

Client 115, as illustrated, can consume network services 137 by accessing CFE 120 in the system 100, which in turn accesses SFE 110 to consume the network service 137, which in turn accesses the real server 105 to supply the network service 137. In the illustrated embodiment, client 115 is any computing device operable to connect to or communicate with at least the CFE 120 (and other components) using a wireline or wireless connection. Client 115 comprises an electronic computer device operable to receive, transmit, process, and store any appropriate data associated with the system 100 of FIG. 1. It will be understood that there may be any number of clients 115 associated with, or external to, system 100. Additionally, there may also be one or more additional clients 115 external to the illustrated portion of system 100 that are capable of interacting with the system 100 via the network 130. Moreover, while each client is described in terms of being used by a single user (e.g., system administrator), this disclosure contemplates that many users may use one computer, or that one user may use multiple computers. Further, the term "client" and "user" may be used interchangeably as appropriate without departing from the scope of this disclosure.

As used in this disclosure, client 115 is intended to encompass a personal computer, touch screen terminal, workstation, network computer, kiosk, wireless data port, smart phone, personal data assistant (PDA), one or more processors within these or other devices, or any other suitable processing device. For example, each client 115 may comprise a computer that includes an input device, such as a keypad, touch screen, mouse, or other device that can accept user information, and an output device that conveys information associated with the operation of the system 100 or the client 115 itself, including digital data, visual information, applications, and/or user interfaces. Both the input and output device may include fixed or removable storage media such as a magnetic storage media, CD-ROM, or other suitable media to both receive input from and provide output to users of the client 115 through the display, namely, a GUI 160.

CFE 120, as illustrated, is an appliance (e.g., a computing device) which acts on the one hand as a client, consuming network services 137 from SFE 110, and on the other hand as a server, providing client 115 with the network services 137 it consumes. In other words, CFE 120 may act as a type of a reflector of the network services it consumes. Moreover, a CFE such as CFE 120 can consume network services 137 from several SFEs. In the illustrated embodiment, CFE 120 is any computing device operable to connect to or communicate with at least the client 115 and/or via the network 130 using a wireline or wireless connection. In general, each CFE 120 comprises an electronic computer device operable to receive, transmit, process, and store any appropriate data associated with the system 100 of FIG. 1. It will be understood that there may be any number of CFEs 120 associated with, or external to, system 100. Additionally, there may also be one or more additional CFEs 120 external to the illustrated portion of system 100 that are capable of interacting with the system 100 via the network 130. Moreover, while each CFE 120 is described in terms of being used by a single user (e.g., system administrator), this disclosure contemplates that many users may use one computer, or that one user may use multiple computers.

As used in this disclosure, CFE 120 is intended to encompass a personal computer, touch screen terminal, workstation, network computer, kiosk, wireless data port, smart phone, personal data assistant (PDA), one or more processors within these or other devices, or any other suitable processing device. For example, each CFE 120 may comprise a computer that includes an input device, such as a keypad, touch screen, mouse, or other device that can accept user information, and an output device that conveys information associated with the operation of the server 105 (and any hosted applications) or the CFE 120 itself, including digital data, visual information, applications, and/or user interfaces. Both the input and output device may include fixed or removable storage media such as a magnetic storage media, CD-ROM, or other suitable media to both receive input from and provide output to users of the CFE 120 through the display, namely, a GUI 160.

CFE 120 may be specifically associated with an administrator of the illustrated environment 100. As described above with reference to SFE 110, for example, the administrator, in some embodiments, can modify various settings associated with one or more of the other CFEs, the client 115 (or other clients), the server 105 (or other servers), other SFEs, hosted applications, and/or any relevant portion of system 100. For example, the administrator can configure CFE 120 to include optimizing engine 150$b$ illustrated in FIG. 1. For example, the system administrator associated with CFE 120 (or another administrator associated with another appliance) may set and/or configure, through the optimizing engine 150$b$: a local configuration of the CFE 120 (e.g., its IP, the IPs it will be listening on, its hostname, and otherwise); network services (e.g., which network service 137 may be consumed by the CFE 120 and which service 137 may be provided by the CFE 120); an ability to manually configure the network service 137; an ability to automatically discover the network services 137 which are available in the network associated with the CFE 120 (e.g., the network services 137 that servers in the CFE 120's network, such as real server 105, provide); parameters of each network service 137 which is delivered to and by the CFE 120 (e.g., the IP that the service 137 is exposed on, the port the service 137 uses, the protocol (HTTP or HTTPS), the type of the service 137, and otherwise); an ability to automatically set values to the parameters; and an ability to manually edit the values of the parameters.

Repository 125 is communicably coupled via the network 130 (or other data communication techniques) to and/or with the system 100. As illustrated, the repository 125 is an appliance (e.g., a computing device) that may consolidate configurations of delivered network services 137 and be able to provide SFEs and CFEs in the system 100 both with data about the network services 137, data about the system 100 itself, and data from the servers in the system 100, such as real server 105. Repository 125 may be any computer or processing device such as, for example, a blade server, general-purpose personal computer (PC), Macintosh, workstation, UNIX-based workstation, or any other suitable device. Repository 125 may also be a personal computer, touch screen terminal, workstation, network computer, kiosk, wireless data port, smart phone, personal data assistant (PDA), one or more processors within these or other devices, or any other suitable processing device. Further, repository 125 may be or include any memory or database module and may take the form of volatile or non-volatile memory including, without limitation, magnetic media, optical media, random access memory (RAM), read-only memory (ROM), removable media, or any other suitable local or remote memory component.

As described above with respect to SFE 110 and CFE 120, a system administrator associated with repository 125 (or another administrator) may set and/or configure: a local configuration of the repository 125 (e.g., its IP, the IPs it will be listening on, its hostname, and otherwise); network services (e.g., which network service 137 may be consumed and/or provided in the system 100); an ability to manually configure the network service 137; an ability to automatically discover the network services 137 which are available in the network associated with the repository 125; parameters of each network service 137 which is delivered to and by the system 100 associated with the repository 125; an ability to automatically set values to the parameters; and an ability to manually edit the values of the parameters. In other words, the present disclosure contemplates that any system administrator of any appliance within the system 100 may be able to configure any appliance within the system 100 according to the above-described abilities.

In the illustrated embodiment, the repository 125 includes or is communicably coupled with a central management tool 127. The central management tool 127 may provide an administrator of repository 125 (or system 100 generally) an ability to access, configure, modify and monitor all the network services 137 in the system from one location or appliance; an ability to define which servers 105 can and/or will provide any particular network service 137 to any particular SFE (such as SFE 110) in the system 100; an ability to define which SFEs will provide any particular network service 137 to any particular CFE (such as CFE 120); and an ability to consolidate the data and the management operations of the system 100.

In some embodiments, certain administrative tasks or capabilities may be set according to permissions. For example, an administrator with high permissions, such as an administrator tasked with operating the central management tool 127, can give another administrator (even in another site) permissions to modify the configuration of various network services 137, as well as appliances within the system 100.

As illustrated, the real server 105, the SFE 110, the client 115, the CFE 120, and the repository 125 are communicably coupled through and with the network 130. Generally, the network 130 facilitates wireless or wireline communications between the components of the system 100 (i.e., between the server 105 and the clients 115), as well as with any other local or remote computer, such as additional clients, servers, or other devices communicably coupled to network 130 but not illustrated in FIG. 1. The network 130 is illustrated as a single network in FIG. 1, but may be a continuous or discontinuous network without departing from the scope of this disclosure, so long as at least a portion of the network 130 may facilitate communications between senders and recipients. The network 130 may be all or a portion of an enterprise or secured network, while in another instance at least a portion of the network 130 may represent a connection to the Internet. In some instances, a portion of the network 130 may be a virtual private network (VPN), such as, for example, the connection between the client 115 and the server 105. Further, all or a portion of the network 130 can comprise either a wireline or wireless link. Example wireless links may include 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

As illustrated, the appliances of system 100, including the real server 105, the SFE 110, the client 115, the CFE 120, and the repository 125 each include a corresponding memory 135. Memory 135, in some embodiments, may include any memory or database module and may take the form of volatile or non-volatile memory including, without limitation, magnetic media, optical media, random access memory (RAM), read-only memory (ROM), removable media, or any other suitable local or remote memory component. Memory 135 may store various network services (such as network services 137 illustrated as stored on the real server 105), objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto. Additionally, memory 135 may include any other appropriate data, such as VPN applications, firmware logs and policies, firewall policies, a security or access log, print or other reporting files, as well as others.

The appliances of system 100, including the real server 105, the SFE 110, the client 115, the CFE 120, and the repository 125 each include a corresponding processor 140. The corresponding processors 140 on each appliance, although illustrated as a single processor, may represent two or more processors used according to particular needs, desires, or particular embodiments of system 100. Each processor 140 may be a central processing unit (CPU), a blade, an application specific integrated circuit (ASIC), a field-programmable gate array (FPGA), or another suitable component. Generally, the processor 140 executes instructions and manipulates data to perform the operations of each corresponding appliance. For example, processors 140 on the SFE 110 and CFE 120, respectively, may execute the corresponding optimizing engines 150a and 150b. Each of the optimizing engines 150a and 150b, which communicate over the network 130 to perform functionality as described herein, may be software encoded on tangible media and/or stored in memory (such as memory 135). Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate.

Conversely, the features and functionality of various components can be combined into single components as appropriate.

In addition, as software, the optimizing engines 150a and 150b may be any application, program, module, process, or other software that may execute, change, delete, generate, or otherwise manage information according to the present disclosure, particularly in response to and in connection with one or more requests received from the illustrated appliances of system 100. In certain cases, environment 100 may implement a composite application, such as the optimizing engines 150a and 150b. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the optimizing engines 150a and 150b may represent web-based applications accessed and executed by the respective SFE 110 and CFE 120, as well as other appliances within the system 100 via the network 130 (e.g., through the Internet). Moreover, any or both of the optimizing engines 150a and 150b (or other applications or hosted applications in system 100) may be a child or sub-module of another software module or enterprise application (not illustrated) without departing from the scope of this disclosure.

The appliances of system 100, including the real server 105, the SFE 110, the client 115, the CFE 120, and the repository 125 each include a corresponding interface 145. The interfaces 145 may be used by the respective appliances for communicating with other systems or other appliances within the system 100 connected to the network 130 (e.g., client 115, as well as other systems communicably coupled to the network 130). Generally, the interface 145 comprises logic encoded in software and/or hardware in a suitable combination and operable to communicate with the network 130. More specifically, the interface 145 may comprise software supporting one or more communication protocols associated with communications such that the network 130 or interface's hardware is operable to communicate physical signals within and outside of the illustrated system 100.

The appliances of system 100, including the real server 105, the SFE 110, the client 115, the CFE 120, and the repository 125 each may include a corresponding graphical user interface ("GUI") 160. GUI 160, at a high level, comprises an interface with at least a portion of system 100 for any suitable purpose, including generating a visual representation of an application (such as the optimizing engines 150a and 150b and a client application 155). Generally, through the GUI 160, a user and/or system administrator is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 160 can represent any graphical user interface, including but not limited to, a web browser, touch screen, or command line interface (CLI) that processes information in system 100 and efficiently presents the information results to the user. In general, the GUI 160 may include a plurality of user interface (UI) elements, some or all associated with the optimizing engines 150a and 150b and the client application 155, such as interactive fields, pull-down lists, and buttons operable by the user at client 115, the SFE 110, the CFE 120, the real server 105, the repository 125, or other appliance in the system 100. These and other UI elements may be related to or represent the functions of the illustrated applications. In particular, the respective GUIs 160 may be used to present the user-based perspective of the optimizing engines 150a and 150b, as well as the consumed network services 137.

The appliances of system 100, including the SFE 110, the CFE 120, and the repository 125, may each also include a corresponding user interface ("UI") 165 communicably coupled to and set and/or configured with the corresponding optimizing engine 150a and 150b. UI 165, at a high level, may, for example, provide the administrator of a corresponding appliance an ability to configure the appliance, as well as the ability to configure the network services delivered from and to that appliance. For example, the UI 165 may allow the administrator of the corresponding appliance the ability to configure the optimizing engine of that appliance, such as optimizing engines 150a and 150b. Thus, in some embodiments, the particular optimizing engine may function according to certain settings or configurations (as described below) applied to the engine through the UI 165. Further, in some embodiments, the GUI 160 may display a plurality of UI elements associated with the UI 165, some or all of which may be associated with the optimizing engines 150a and 150b and the client application 155, such as interactive fields, pull-down lists, and buttons operable by the user. These and other UI elements of the UI 165 may be related to or represent the functions of the illustrated applications.

Figure 8A:
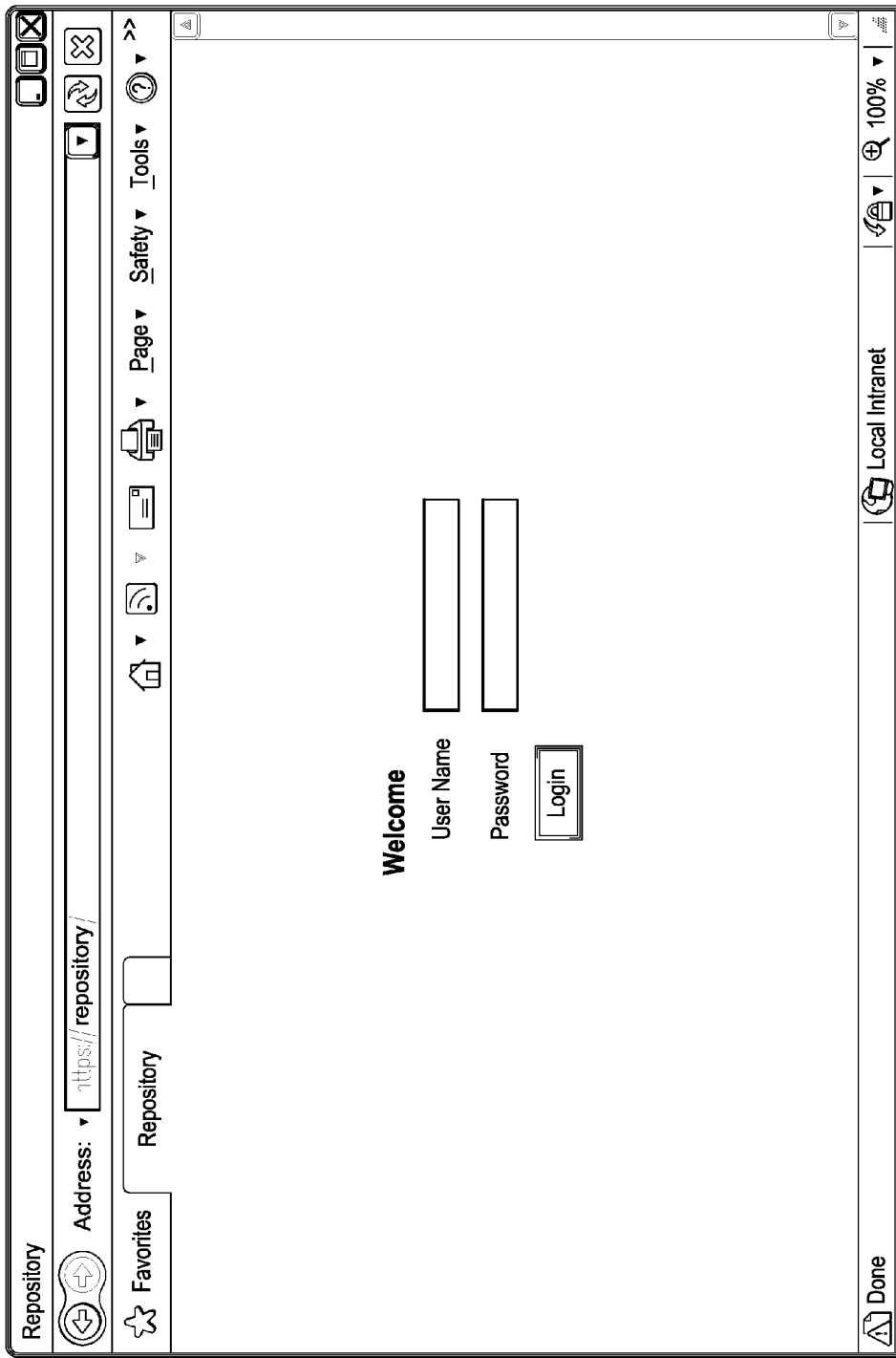
FIGS. 8A-D illustrate example graphical interfaces from a User Interface that may be used in conjunction with an optimizing engine according to the present disclosure.

Turning briefly to FIGS. 8A-D, these figures illustrate example graphical interfaces from a UI, such as UI 165 illustrated in FIG. 1. FIG. 8A illustrates an example login page 800 to a UI of a particular appliance in a distributed computing system (such as system 100). As illustrated, the login page 800 allows a system administrator to login to a UI of a repository appliance of the system. Different appliances (e.g., SFEs, CFEs) may have similar or different login pages. In some embodiments, the UI may include a command line interface ("CLI"), which can configure and display data like the illustrated web-based UI shown in FIG. 8A.

Figure 8B:
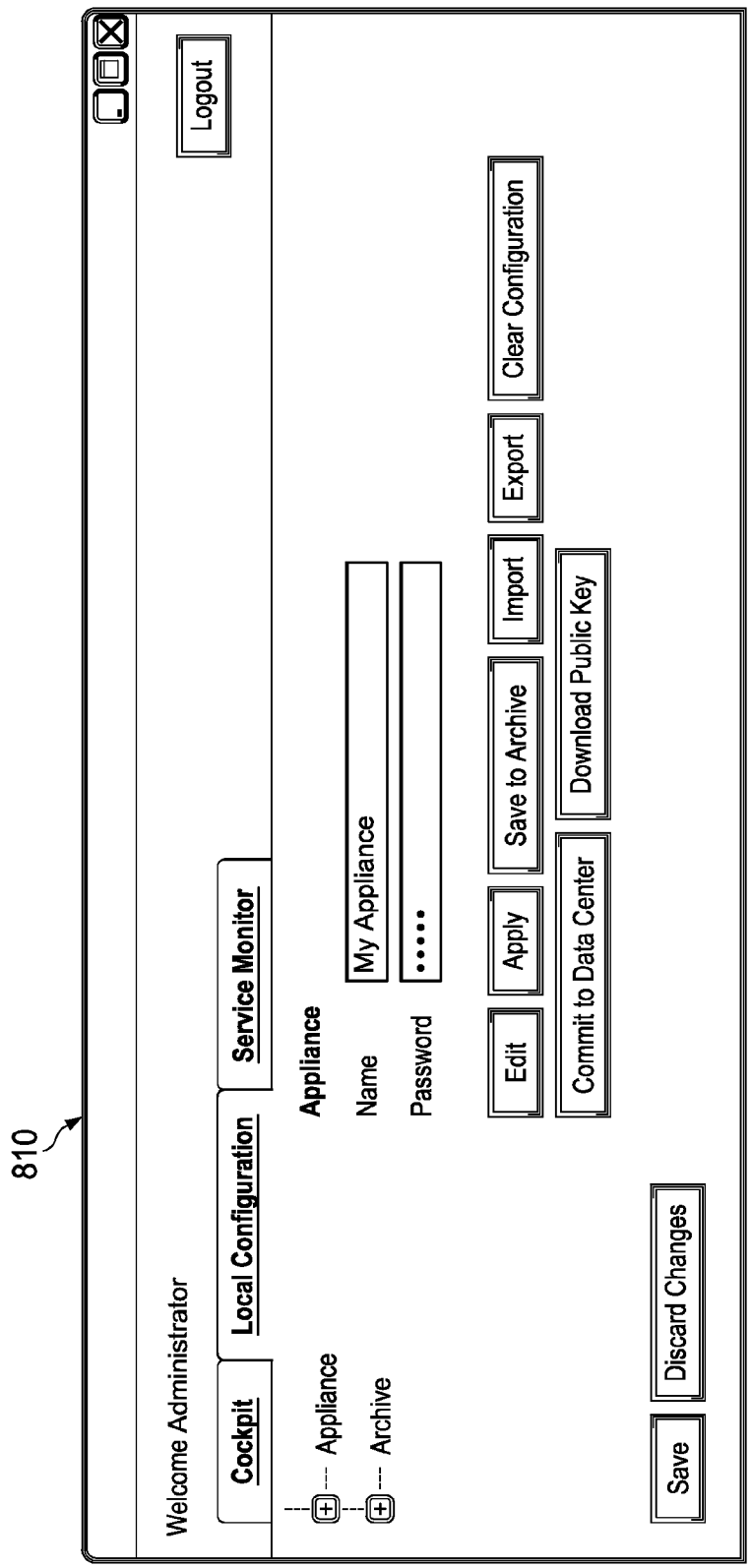

Turning to FIG. 8B, this figure illustrates an example root interface 810 of a UI of a particular appliance (e.g., CFE, SFE, repository) after the system administrator has logged in through the login page 800 (or other login page). The root interface 810 includes the cockpit, local configuration, and service monitor (shown in more detail in FIGS. 6A-D) tabs, along with information regarding the name of the appliance. In some embodiments, the root interface 810 of each particular appliance-type (e.g., CFE, SFE, repository) may include each illustrated tab, as well as the illustrated data about the particular appliance. In alternate embodiments, the root interface 810 of certain appliance-types may only include certain tabs (e.g., only root interface 810 of CFEs may include the service monitor tab).

Figure 8C:
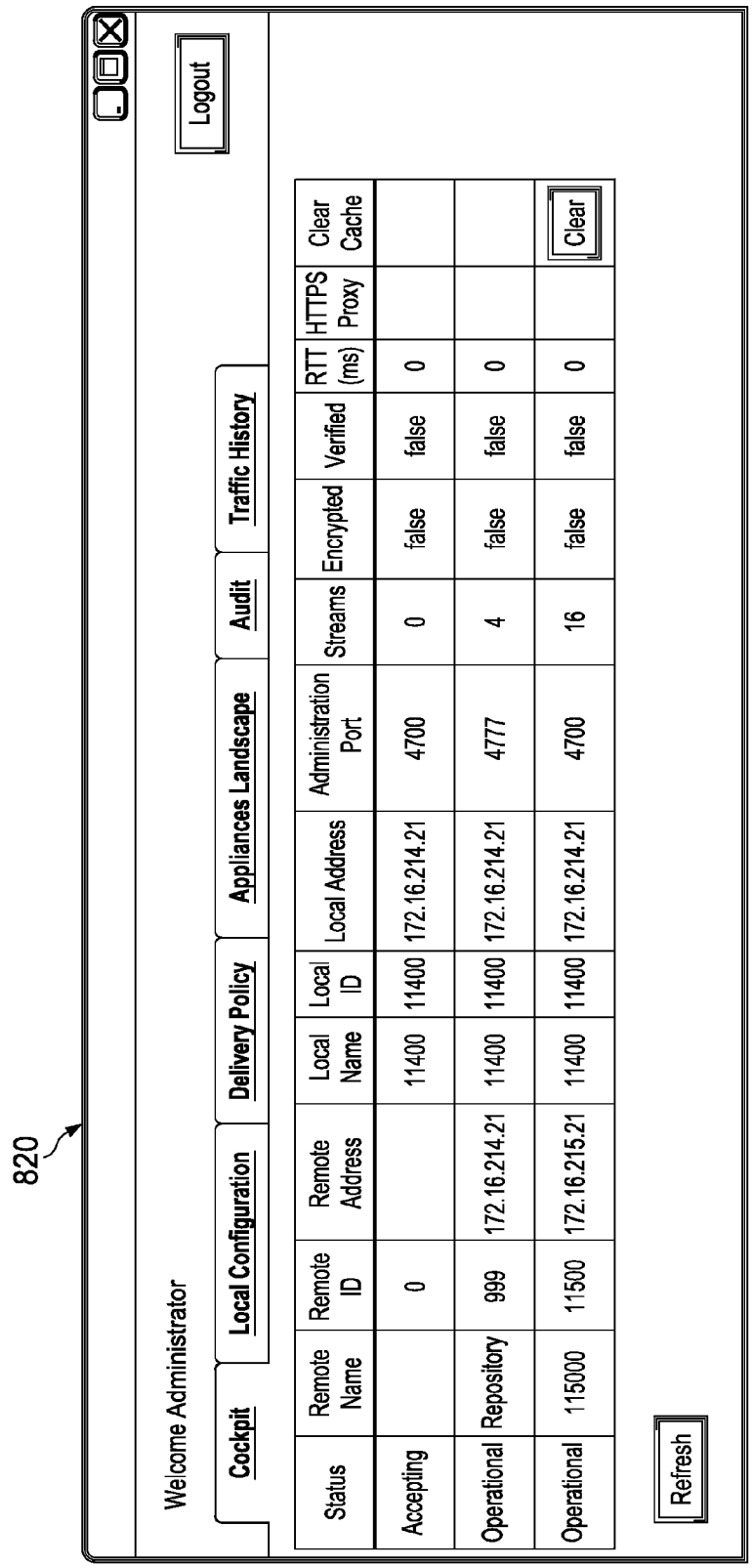

Turning to FIG. 8C, this figure illustrates an example root interface 820 of a UI of a particular computing device that is configured to include both a repository (i.e., Remote Name "Repository") and an SFE (i.e., Remote Name "115000"). In some embodiments, for instance, a particular computing device may be configured as a combination of two (or more) appliance-types, such as a repository and an SFE, or an SFE and a CFE, or a repository and a CFE, and so on. The illustrated root interface 820 includes a cockpit, local configuration, delivery policy, appliances landscape, audit, and traffic history tab. The delivery policy tab, for example, may allow a system administrator to configure certain network services provided by and/or consumed by the particular appliance. The cockpit tab shows the links that the current appliance has to other appliances. In some embodiments, the traffic history and audit tabs show data collected in the repository, including events which occurred in the system, and historical data of network traffic in the distributed computing system. But, in some embodiments, data may also be collected in a database and/or memory (such as memory 135) of each appliance in the distributed computing system. Further, there may be multiple locations (e.g., CFEs, SFEs, repositories, or otherwise) collecting data.

Figure 8D:
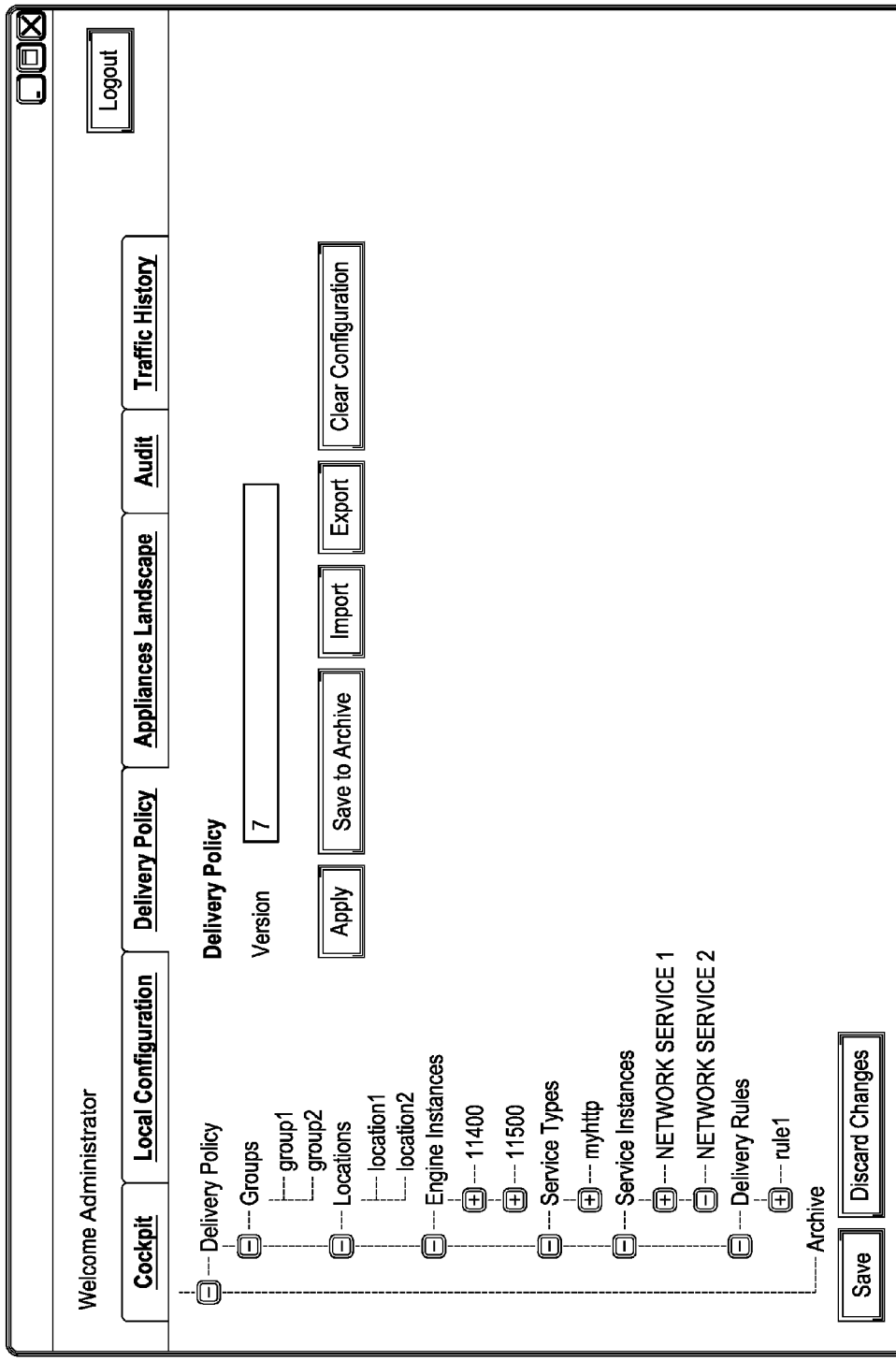

Turning to FIG. 8D, this figure illustrates a delivery policy tab 830 of a UI. Through the delivery policy tab 830, a system administrator may configure a particular network service. For example, the administrator may configure: appliances into particular groups; which specific network service and/or groups of network services may be provided on each particular group of appliances; which groups of network services the particular network service is a member of; the locations (e.g., appliances) that the particular network service may be provided by, consumed by, and/or stored on; the optimizing engine instances (e.g., configured on CFEs and SFEs) that may provide and/or consume the particular network service; the type of the network service; the delivery rules for the particular network service; and so on. As one example, locations of appliances can be configured, both for modeling the system, and for being able to specify: network service delivery characteristics according to locations, usage of optimizations and suggestions based on this static data of the appliances' locations, and otherwise.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

FIGS. 2A-B illustrate topological representations of example distributed computing systems 200 and 250, respectively, including an optimizing engine. Turning particularly to FIG. 2A, this figure illustrates a network topology of the distributed computing system 200 that includes a real server 205, an SFE 210, a CFE 215, a client 220, and a repository 230. These appliances, or components, of the system 200 may be identical to or substantially similar to those components of the same name as described in FIG. 1. Further, one or preferably both of the SFE 210 and CFE 215 includes an optimizing engine, such as the optimizing engine 150a and 150b illustrated in FIG. 1.

System 200, in some aspects, illustrates a standard topology, for example, where network services are provided from the server 205 to the SFE 210, which acts both as a network service consumer (from the server 205) and a network service provider (to the CFE 215). In some aspects, the SFE 210 is a consumer of network services from the server 205 at the request of the CFE 215. The CFE 215 may also act as a network service consumer (from the SFE 210) as well as a network service provider (to the client 220). Further, as illustrated, the repository 230 may be communicably coupled to the SFE 210 and CFE 215 to provide, for example, consolidation of configurations of delivered network services and data about the network services and system 200 itself to the SFE 210 and CFE 215.

Turning now to FIG. 2B, this figure illustrates another example topology of the distributed computing system 250 that includes a client 255, an SFE 260, a CFE 265, a real server 270, and a repository 280. As illustrated, therefore, system 250 may represent a reverse topology, in which the roles of the SFE and CFE are switched relative to the system 200 described in FIG. 2A. For example, FIG. 2B illustrates a system in which a network service may be provided in a reverse direction as compared to system 200. For example, the client 255 may request a particular network service stored on, for example, the server 270, from the SFE 260, which in turn communicates the request to the CFE 265. The CFE 265 in turn passes this request to the server 270, thereby becoming a network service consumer of the server 270 and a network service provider to the SFE 260. The SFE 260, in turn, becomes a network service consumer from the CFE 265 and a network service provider to the client 255. As described above with respect to repository 230, the repository 280 may be communicably coupled to the SFE 265 and CFE 260 to provide, for example, consolidation of configurations of delivered network services and data about the network services and system 250 itself to the SFE 265 and CFE 260.

Distributed computing systems 200 and 250 includes links 225 and links 275, respectively, which communicably couple the appliances of the respective systems. Each link 225 and 275, in some aspects, is a network connection between two (or more) appliances in the systems 200 and 250. Certain illustrated links 225 and 275 may be bidirectional, such that communication between the coupled appliances may be in two-directions. But in some embodiments, various links (such as links 225 and 275) may be unidirectional, such that communication between the coupled appliances may be only in one direction.

The links 225 and 275 may serve a variety of functions and purposes. For example, links 225 and 275 may create and/or represent communication pathways between appliances in the system 200. In some embodiments, a particular communication pathway may include at least two appliances and a link (225 or 275) between the appliances. As another example, a particular link (225 or 275) between a client and a CFE may provide for the ability of the CFE to act as a proxy for client(s) (e.g., a gateway, DNS, or otherwise). The link may thus, allow and/or provide a controlled network traffic by, for example, controlling bandwidth over the link, controlling a load over the link (e.g., a processing load or a data transmission load), controlling content passed over the link (i.e., filtering, altering, or otherwise), and also stopping certain content from being communicated between the appliances to which the link is connected (e.g., a firewall). By controlling these properties, the link (225 and/or 275) may facilitate (in conjunction with the optimizing engine) load balancing between SFEs in a system (as described in more detail below). The link (225 and/or 275) may also facilitate (in conjunction with the optimizing engine) load balancing between servers in the system.

Links 225 and/or 275 (in conjunction with the optimizing engine) may facilitate acceleration of network services (thereby providing lower response times for requests of network services by clients 220 and 255) by, for example, compressing content flowing in the system (e.g., network services flowing from the server 205 to the client 220); caching the content stored in the system, (e.g., network services originating at the server 205 but stored at, for example, the CFE 215); building a dictionary (e.g., a hash map) between SFEs and CFEs of known "keywords." For example, the keywords may be terms that the optimizing engine on each SFE and CFE understands to require, initiate, or facilitate, a particular command or instructions. Thus, less traffic may be required between a CFE and an SFE compared with the traffic required between a client and a server directly. Further, the links 225 and/or 275 (in conjunction with the optimizing engine) may facilitate acceleration of network services by prioritizing a particular network service, such that it is delivered from the server 205 to the client 220 before other network services.

For example, in some embodiments, a particular keyword may represent and/or translate data strings that are larger (i.e., require larger number of bits) than the keyword itself. For instance, a CFE may request a network service from an SFE. The SFE may respond to the request with the keyword, where both the SFE and CFE understand the keyword to represent a larger data string. The keyword may be added to a dictionary "on the fly." For instance, as or after the larger data string flows from the SFE to the CFE for the first time, each appliance may apply a pre-defined algorithm known to both appliances (like md5sum or any other hash function) on this data string, and retrieve the data string's matching keyword. Thus, the next time that the same request is made of the SFE by the CFE, the keyword may be communicated rather than the larger data string.

Links 225 and/or 275 (in conjunction with the optimizing engine) may also decrease or help decrease a processing load executing on the real server 205 and/or 270 by responding to requests from their respective clients 220 and 255 without addressing the real servers 205 and 270 by using the cache and the known network service. The links 225 and/or 275 (in conjunction with the optimizing engine) may also provide a more secure landscape by encrypting content (e.g., network services) which flow in and/or through the systems 200 and 250, respectively. The links 225 and/or 275 (in conjunction with the optimizing engine) may also synchronize data and configurations between the connected appliances (e.g., the CFEs and SFEs in the systems 200 and 250) automatically without any manual intervention.

Figure 3A:
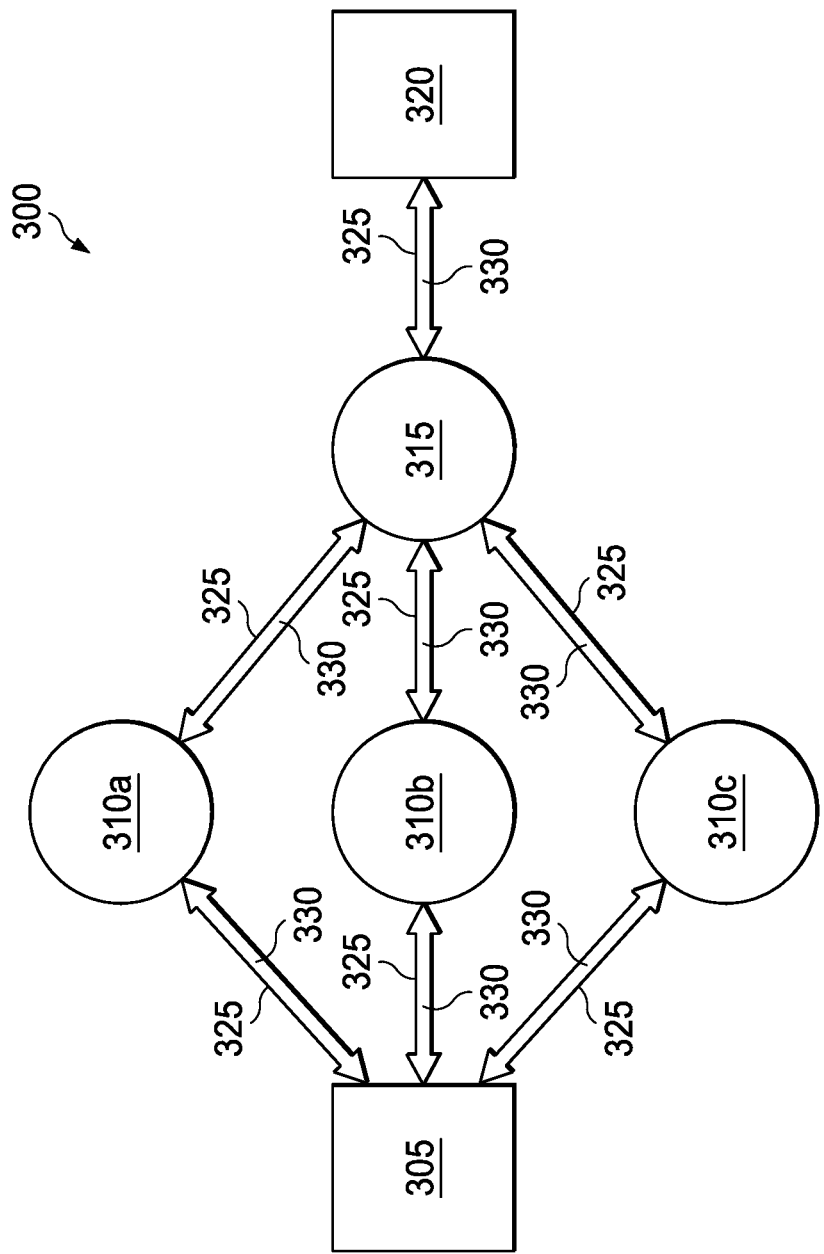
FIGS. 3A-B illustrate topological representations of example distributed computing systems including an optimizing engine facilitating load balancing according to the present disclosure.
Figure 3B:
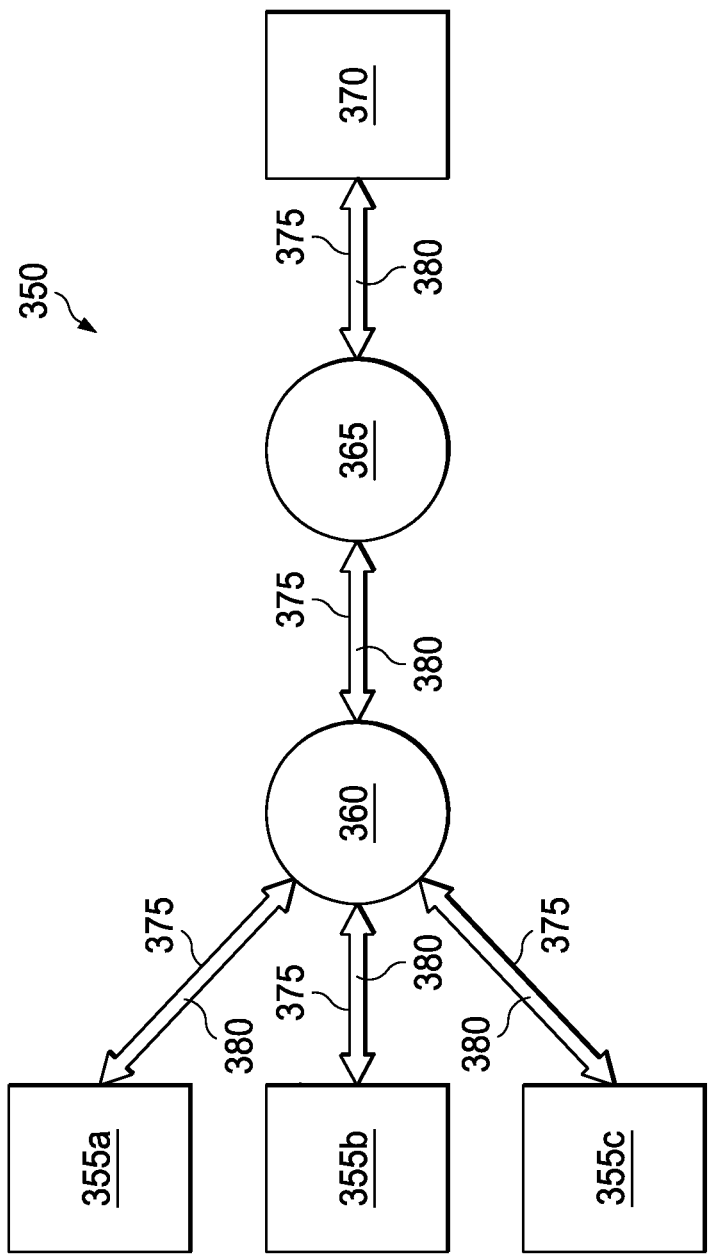

FIGS. 3A-B illustrate topological representations of example distributed computing systems 300 and 350 including an optimizing engine facilitating load balancing between, for example, SFEs and/or real servers in the systems. Turning particularly to FIG. 3A, the system 300 illustrates load balancing between SFEs 310a, 310b, and 310c. As illustrated, each of the SFEs 310a-c is coupled to a real server 305 and a CFE 315, which is in turn coupled to a client 320. Each of the aforementioned appliances are connected through links 325. As illustrated in FIG. 3A, a particular network service 330, stored on the server 305, may be communicated through the system 300 via the links 325 to the client 320.

Each of the SFEs 310a-c and the CFE 315 may include an optimizing engine facilitating the communication of the network service 330 through the system 300 to the client 320. Further, as illustrated, the optimizing engines on the SFEs 310a-c and CFE 310 may facilitate load balancing between the SFEs 310a-c. For example, one or more optimizing engines configured on the SFEs 310a-c and the CFE 315 may monitor a number of variables of the system 300 and, based on these variables, route the network service 330 from the server 305 to the particular SFE 310a, 310b, or 310c, which has the lowest dynamic operating and/or processing load. Thus, the network service 330 may be routed as quickly as possible to the client 320 from the real server 305.

More specifically, the optimizing engines on the respective SFEs 310a-c and the CFE 315 may monitor, measure, and analyze automatically network traffic both per network service, and for the network (i.e., system 300) as a whole. Thus, dynamic optimization of the performance of the system 300 in delivering the network service 330 may be accomplished with the advantages of, for example, lowered response times to clients' requests and resolution of bottlenecks in the system 300. The optimizing engines on the respective SFEs 310a-c and the CFE 315 may measure variables, such as, for example, the topology of the system 300 (e.g., the number of SFEs, the number of CFEs, the number of servers, and the available network services on each server); processing loads of the appliances of the system 300; memory usage of the appliances of the system 300; traffic, bandwidth, and latency in each link 325; the number of requests from each client in the system 300 to each CFE; the popularity of the network service 330; historical data of the server 305 and the network service 330; historical behavior of the SFEs 310a-c, the CFE 315, the server 305, and the network service 330.

Based on these measured variables, the optimizing engines on the respective SFEs 310a-c and the CFE 315 may adjust one or more variables in order to optimize the network's performance, such as, for example: between which and how many SFEs to load balance, between which and how many servers to load balance; between which and how many SFEs to split delivery of network service 330 to the client 320 (e.g., SFE 310a caches and compresses the network service 330, SFE 310b encrypts the network service 330, and SFE 310c accelerates the network service 330); network bandwidth allocated for the network service 330; traffic quota allocated for the network service 330; type of the network service 330; priority of the network service 300; allocated processing load quota; allocated memory usage quota; whether acceleration has been set to on or off; whether compression has been set to on or off; the compression rate; whether encryption has been set to on or off; the encryption level; and whether caching has been set to on or off.

These adjustments made by the optimizing engines on the respective SFEs 310a-c and the CFE 315 may be made based on, for example: a property (e.g., type, priority) of the network service 330; collected data of the system 300; historical behavior of the network service 330; latency of the system 300; latency in different links in the system 300; round trip time ("RTT") of the network service 330; RTT between different nodes in the system 300; processing loads of the SFEs and CFEs in the system 300; memory usages in the SFEs and CFEs; and QoS configurations. For example, with respect to QoS configurations, the optimizing engines on the respective SFEs 310a-c and the CFE 315 may facilitate and/or define a reserved and/or restricted amount of resources for a particular network service, such as, for example, bandwidth quota, traffic quota, cache quota, processing load, memory usage, number of clients, and number of client requests.

Turning to FIG. 3B, the system 350 illustrates load balancing between a number of real servers 355a through 355c. As illustrated, each of the servers 355a-c is coupled to an SFE 360, which is in turn coupled to a CFE 365, which is in turn coupled to a client 370. Each of the aforementioned appliances is connected through links 375. As illustrated in FIG. 3B, a particular network service 380, stored on each of the servers 355a-c, may be communicated through the system 350 via the links 375 to the client 370.

Each of the SFE 360 and the CFE 365 may include an optimizing engine facilitating the communication of the network service 380 through the system 350 to the client 380. Further, as illustrated, the optimizing engines on the SFE 360 and CFE 365 may facilitate load balancing between the servers 355a-c. For example, one or more optimizing engines configured on the SFE 360 and the CFE 365 may, as described above, monitor a number of variables of the system 350 and, based on these variables, route the network service 380 from a particular of the servers 355a, 355b, or 355c to the SFE 360. Thus, the network service 380 may be routed as quickly as possible to the client 370 from one of the real servers 355a-c. For example, a client can request a network service (e.g., a web page), which contains text and multiple images. The text can be supplied from real server 355*a*, a first image from real server 355*b*, and other images from the cache of the CFE 365, thereby decreasing service delivery time and decreasing the load on the links and appliances (i.e., real server 355*a*, real server 355*b*, CFE 365) in the system The above-described load balancing techniques may further be illustrated by the following examples. For instance, a link typically used for serving a high-priority network service can be utilized for serving other network services when the link is free. As another example, acceleration of low priority network services, or low bandwidth network services, can be stopped and bypassed in order to serve other network services with higher priorities, or with higher traffic quotas. As another example, a listening point for a particular network service (e.g., an IP or port on which an appliances expects a network service to be available) can be changed in order to add a new network service to that particular listening point.

Further, a distributed computing system may combine aspects of systems 300 and 350. For example, a larger distributed computing system may include systems 300 and 350 as system components that are communicably coupled. Thus, load balancing among SFEs and real servers may occur in a single distributed computing system.

Figure 4:
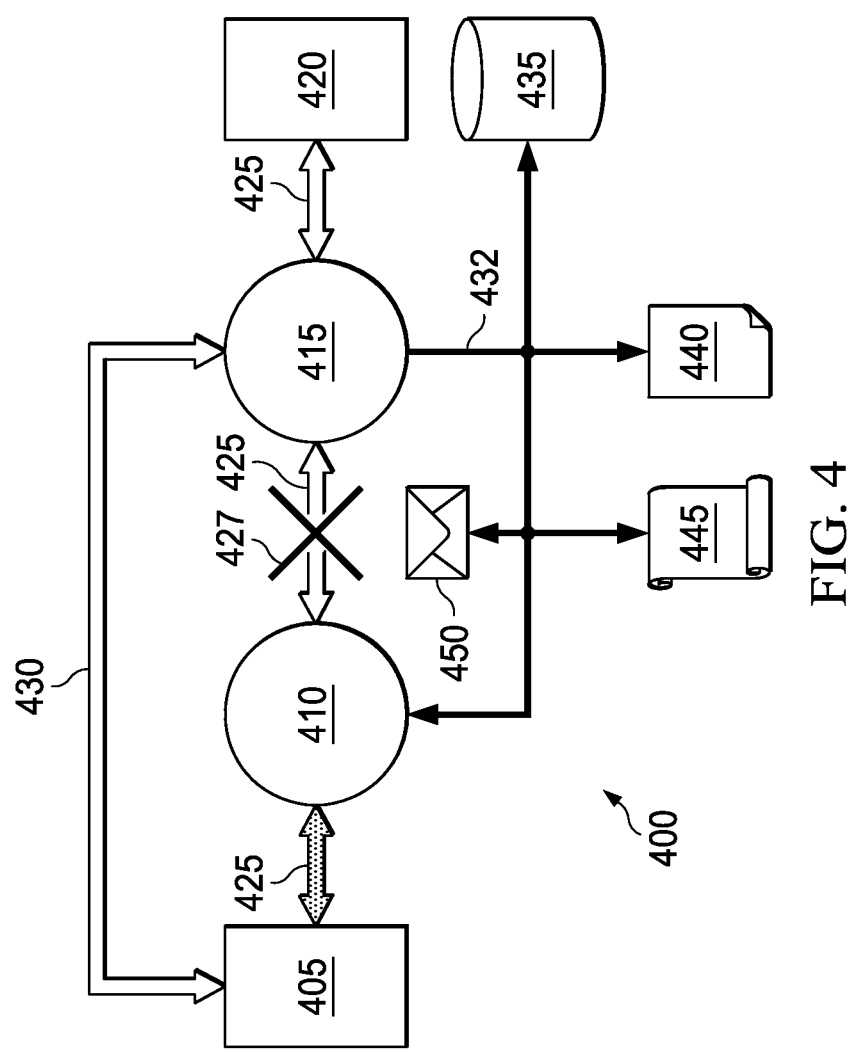
FIG. 4 illustrates a topological representation of an example distributed computing system including an optimizing engine facilitating a bypass according to the present disclosure.

FIG. 4 illustrates a topological representation of an example distributed computing system 400 including an optimizing engine facilitating a bypass link 430 around an event 427 in the system 400 that causes miscommunication of a network service from a real server 405 to a client 420. The illustrated system 400 includes the real server 405, an SFE 410, a CFE 415, and the client 420. Each of the aforementioned appliances of system 400 is communicably coupled by links 425. Each of the SFE 410 and the CFE 415 may include an optimizing engine facilitating the communication of network services through the system 400 to the client 420. Further, as illustrated, the optimizing engines on the SFE 410 and CFE 415 may facilitate automatic event handling in the system 400.

As illustrated, a particular link 425 may be unavailable (e.g., broken, temporarily unavailable, or otherwise) due to an event 427 in the system 400. Although illustrated as between the SFE 410 and the CFE 415, the event 427 may occur in virtually any location within the system 400.

In some aspects, an event may be one or more of the following example occurrences: a network service is down; a network service is back up; an SFE, CFE, and/or server is down; an SFE. CFE, and/or server is back up; a link is down; a link is back up; a bypass is down; a bypass is back up; bandwidth usage exceeds a threshold (e.g., per link, or per network service, or in the system 400 as a whole); traffic load exceeds a threshold (e.g., per link, or per network service, or in the system 400 as a whole); processing load exceeds a threshold; memory usage exceeds a threshold; network contention exceeds a threshold; new network service was added; new network service was discovered; a particular network service is no longer offered from a particular SFE to a particular CFE, and otherwise.

The optimizing engines on the SFE 410 and CFE 415 may facilitate event handling in a number of manners. For example, the optimizing engines on the SFE 410 and CFE 415 may be manually configured to handle certain events and/or certain groups of events. For instance, a system administrator can manually configure the optimizing engine on the SFE 410 to handle all events disabling the link 425 between the server 405 and the SFE 410 with a particular solution (e.g., with a bypass link 430). As another example, the optimizing engines on the SFE 410 and CFE 415 may automatically generate or configure solutions to particular events and/or groups of events. The optimizing engines on the SFE 410 and CFE 415 may further group events for handling. In addition, such automatic handling of different events may be based on one or more manually or automatically pre-defined actions in response to such different events.

In response to certain events, such as event 427, the optimizing engines on the SFE 410 and CFE 415 may automatically generate a bypass around the broken link. For example, bypass link 430 may be set to allow communication from the server 405 to the CFE 415 to communicate, for example, a network service requested by the client 420. Bypasses, such as bypass link 430, may also be automatically generated or discarded by the optimizing engines on the SFE 410 and CFE 415 based on, for example, an automatic discovery of services and servers which are down (no longer available, thereby generating or causing the generation of a bypass) and/or an automatic discovery of services and servers which are back up (available once again, thereby unsetting or causing a bypass to be unset). Further, bypass 430 can also be manually set/unset for a single/group of network services/servers/links, regardless of whether they are up or down.

In some embodiments of system 400 (or other systems described herein), a notification process may occur based on a particular event, a group of events, and/or other occurrences in the system. For example, as illustrated in FIG. 4, an occurrence of an event, such as the event 427, may cause the optimizing engines on the SFE 410 and/or CFE 415 to generate and transmit one or more notifications, such as notification 432. Notification 432 may be transmitted from, for example, the CFE 415 to: a database 435 (e.g., for storage, historical data mining, or otherwise); an SMS message 440; a log file 445; and an email 450. Of course, the illustrated locations for the notification 432 are merely examples, and other targets may include voicemails, pager notifications, and other data communication techniques. The optimizing engines on the SFE 410 and/or CFE 415 may be manually configured to generate and/or automatically generate the notification 432 based on, for example, the particular event that occurred, the particular target, the particular group of the event, and/or the particular group of the target. For example, an administrator may configure the notifications' targets from different views, for instance, what will be the targets of notifications for events of type Y, which notification will target X receive, and so on.

In some embodiments, the optimizing engines on the SFE 410 and/or CFE 415 may facilitate an automatic recovery of an appliance and/or link after an event has ended. For example, when an appliance (such as an SFE or CFE) is available after a failure, the appliance may be automatically recovered to its pre-event state via the optimizing engines on the SFE 410 and/or CFE 415. For example, the optimizing engines on the SFE 410 and/or CFE 415 may gather needed information from other appliances in the system 400, such as, for example, the recovered appliance's role in the system 400; a configuration of a network service; bypass states; cache data; and/or a dictionary (i.e., defining the pre-event state of the recovered appliance and stored on another appliance, such as an SFE, CFE, and/or repository).

Figure 5:
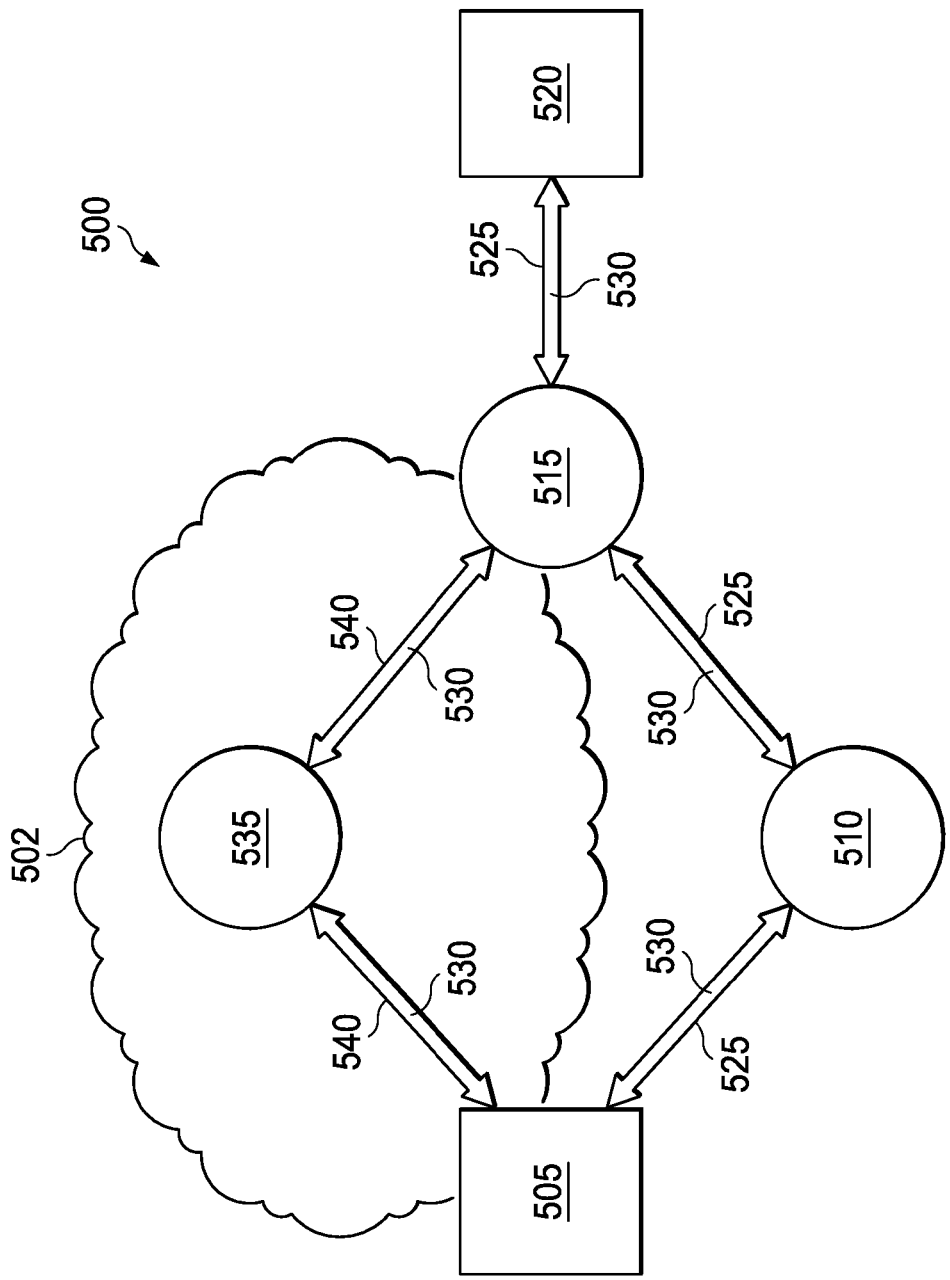
FIG. 5 illustrates a topological representation of an example distributed computing system including an optimizing engine facilitating a suggestions mechanism according to the present disclosure.

FIG. 5 illustrates a topological representation of an example distributed computing system 500 including an optimizing engine facilitating a suggestions mechanism. The illustrated system 500 includes a real server 505, an SFE 510, a CFE 515, and a client 520. Each of the aforementioned appliances of system 500 is communicably coupled by links 525. Each of the SFE 510 and the CFE 515 may include an optimizing engine facilitating the communication of network services through the system 500 to the client 520, such as the network service 530. Further, as illustrated, the optimizing engines on the SFE 510 and CFE 515 may facilitate or execute a suggestions mechanism in order to, for example, improve response times of requests for network services by the client 520.

More specifically, in some aspects, the optimizing engines on the SFE 510 and CFE 515 may monitor a number of different variables of the system 500 (as described above with respect to FIGS. 3A-B) and compare these variables to predefined objective goals of a system administrator and, based on these comparisons, provide suggestions to the administrator to help meet the goals. For example, the administrator may define one or more of the following example objective criteria in order to, for instance, achieve a predefined ratio of network cost to network performance: maximum cost per appliance (e.g., SFEs, CFEs, repositories); maximum cost per network service; maximum cost per amount of network services; maximum cost per compression rate; maximum cost per encryption level (higher/lower security level); maximum cost per traffic; maximum cost per bandwidth usage; maximum cost by latency; and maximum cost per clients' accesses to CFEs.

In order to meet the objective goals of the administrator, which are provided to the optimizing engines on the SFE 510 and/or CFE 515, the optimizing engines may analyze the monitored variables to determine, for example, how to improve performance; how to solve events in the system; where are the bottlenecks in the system and how to solve them; how to lower the load on different points (e.g., nodes, links, appliances) in the system; how to simplify the topology of the system; how to improve the functionality of the network services; which types of network services to add and/or remove; how to modify a service's configuration to better suit the requirements of the service; how to save money; how many SFEs or CFEs to add or remove and where; how to improve the topology of the network; which appliances in the system are redundant; which network services in the system are redundant; which servers in the system are redundant. Based on the outcome of these determinations, the optimizing engines on the SFE 510 and CFE 515 may provide suggestions to the administrator, such as suggestions regarding: adding new network services to improve stability/load balancing; adding more SFEs to help load balancing between servers; and adding more CFEs to help load balancing between clients' requests.

In some aspects, the above considerations and suggestions generated by the optimizing engine may be particularly useful in a cloud computing environment, or other Internet-based computing, whereby shared resources, software, and information are provided to computers and other devices on demand, like a conventional utility scenario. For example, for a system administrator in a cloud computing environment, the objective criteria may be a maximum cost per required resource. For example, the administrator may be financially responsible for a cost per online storage space (e.g., 5 GB, 10 GB, and so on). This cost may escalate with the amount of storage. Thus, utilizing the above objective criteria, the optimizing engine may provide a suggestion to, for example, add additional space (e.g., real servers), add additional SFEs, and/or add additional CFEs to minimize the cost per online storage space. For example, a twofold increase in online storage space (from 5 GB to 10 GB) may not increase the costs per online storage twofold. Thus, the cost per required resource (i.e., online storage space) may be decreased.

Further, the optimizing engine, in generating one or more suggestions to an administrator, may utilize linear and/or integer programming by modeling a distributed computing system (such as those systems shown herein). For example, modeling the distributed computing system (e.g., defining x as the number of appliances in the system, y as the bandwidth in each link, and z as the number of links in the system) may include the administrator defining an objective function. The objective function could be either a minimization problem or maximization problem, such as, for example, minimizing total cost of the system represented by the mathematical expression: (cost per appliance)*x+(cost per unit of bandwidth)*y*z) along with constraints which are described by mathematical inequalities (e.g., $10<x<=20$, $y>2$, $57<=z<=57$ (which means z=57 described in inequalities)). These expressions may be the inputs for an algorithm which can solve liner programming and/or integer programming problems (e.g., the Simplex algorithm which solves linear programming problems). The algorithm calculates values for x, y, and z that answer the constraints and supply one of the best possible results for the objective function, i.e. the matching minimal cost. In some aspects, the matching minimal cost may not be the absolute minimal cost but may be close to the absolute minimal solution, due to, for example, reasonable time constraints on the computations. In addition, in some aspects, the algorithmic output may be "no possible solution," if, for example, one or more of the defined constrains cannot be satisfied or met. In any event, the suggestions mechanism of the optimizing engine may, based on an administrator's input {e.g., variables that model a distributed computing system and can be suggested to the administrator), objective function (s), and matching constraints, provide optimal suggestions. In some cases, alternatively, the suggestions may not be optimal, but may fit the constraints provided by the administrator.

With reference to FIG. 5 in particular, a suggestion 502 is graphically represented. The suggestion 502 includes an addition of a new SFE 535 communicably coupled to the existing real server 505 and the existing CFE 515 via new links 540. Thus, the suggestion 502, which may be communicated to one or more system administrators via the optimizing engines on the SFE 510 and CFE 515, may provide for increased response times to requests of network service 530 by the client 520 due to, for example, an improved ability to load balance between the existing SFE 510 and the new SFE 535.

FIGS. 6A-D illustrate example service monitor user interfaces of an optimizing engine used in a distributed computing system. For example, the optimizing engines 150*a* and 150*b*, as well as other optimizing engines described herein with respect to the distributed computing systems 200, 250, 300, 350, 400, and 500, may include a service monitor 600 with a user interface (UI) illustrated in FIG. 6A. In some aspects, the service monitor may be a UI component, comprising network and network services related components, that is a component of or included with a UI installed on an appliance, such as the UI 165 illustrated in FIG. 1, with a corresponding optimizing engine.

The illustrated interface 600 of the service monitor, generally, may display data associated with the network services consumed and provided by the particular appliance. For example, the service monitor 600 displays an instance ID 602, a service name 604, a service type 606, a service current status 608 (e.g., up or down), a bypass status 610 (e.g., an adjustable indication of whether the service is in a bypass), a service access point 612 (virtual IP address and port), a service connect point 614 (real IP address and port), a service availability 616 (e.g., calculated percentage of time service is up), a service history 618, and a service mean time between failure ("MTBF") 624.

Figure 6C:
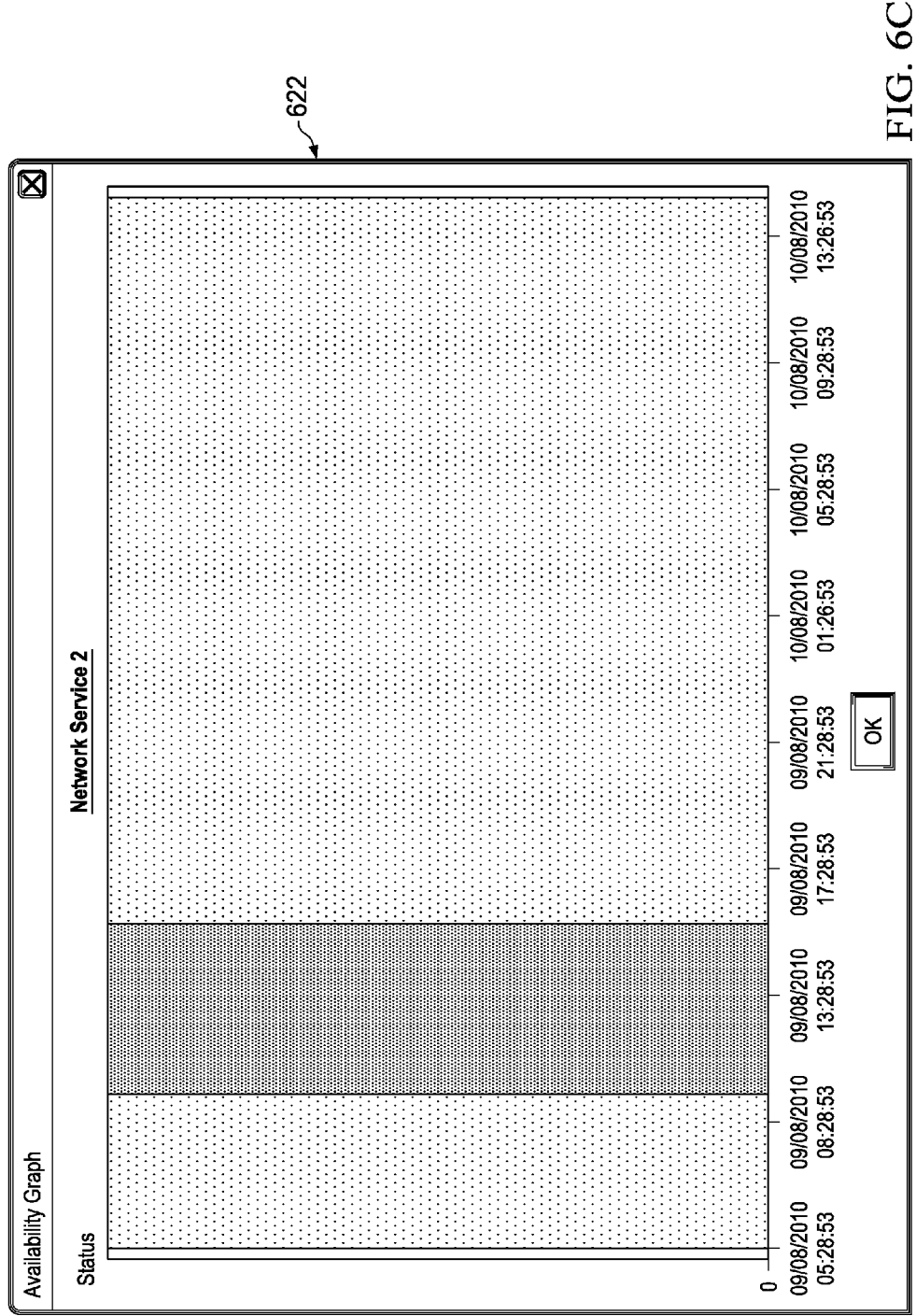

The service history 618 may take one or more forms or representations. For example, with reference to FIG. 6B, the service history 618 may be a log 620. The log 620 may display to a system administrator the correlation between the service's historical status and a date/time. For example, as illustrated, a system administrator may view the log 620 to determine the exact date/times that a particular network service was interrupted and/or restored. Turning to FIG. 6C, the system administrator may also view a service availability graph 622. The service availability graph may graphically show when a particular network service was unavailable and/or available. Further, the service availability 616 may be calculated by determining a ratio of an area for a shaded portion of the graph corresponding to an available service to a total displayed area of the graph.

In some aspects, an administrator may, via the service monitor, modify configurations and/or parameters of a particular network service and/or group of services, such as, for example: the type of the service; a fully qualified domain name ("FQDN") on which the service is served on the real server; a FQDN on which the service is served on the CFE; IP address on which the server is listening in order to provide the service; IP address on which the CFE is listening in order to provide the service; port on which the server is listening in order to provide the service; port on which the CFE is listening in order to provide the service; encryption of the service on/off; encryption level of the service; compression of the service on/off; compression rate of the service; caching of the service on/off; and acceleration of the service on/off.

In addition, in some embodiments, an administrator may, via the service monitor, configure the notification services of the optimizing engine; configure the pre-defined actions and events handling ability of the optimizing engine; allow administrators to "switch roles" (e.g., a CFE administrator can change/add/remove network services, a CFE can provide network services to an SFE (reverse delivery); and configure the suggestions mechanism of the optimizing engine. In some aspects, the service monitor may also allow an administrator the ability to add network services provided from one appliance to another appliance (according to permissions, administrative role, and administration delegation capability). For example, this may be accomplished by a request: a request is sent from one appliance to another appliance requesting the other appliance to provide a network service; the other appliance may confirm or ignore the request. The service monitor may provide the administrator of the other appliance the ability to confirm or ignore the request. This may also be accomplished by a trusted mode of the service monitor: an appliance may, through its optimizing engine, add a known network service from another appliance without the other appliance's approval. This may also be accomplished by a push mode of the service monitor: an appliance provides a network service to another appliance without the other appliance requesting the service.

Figure 6D:
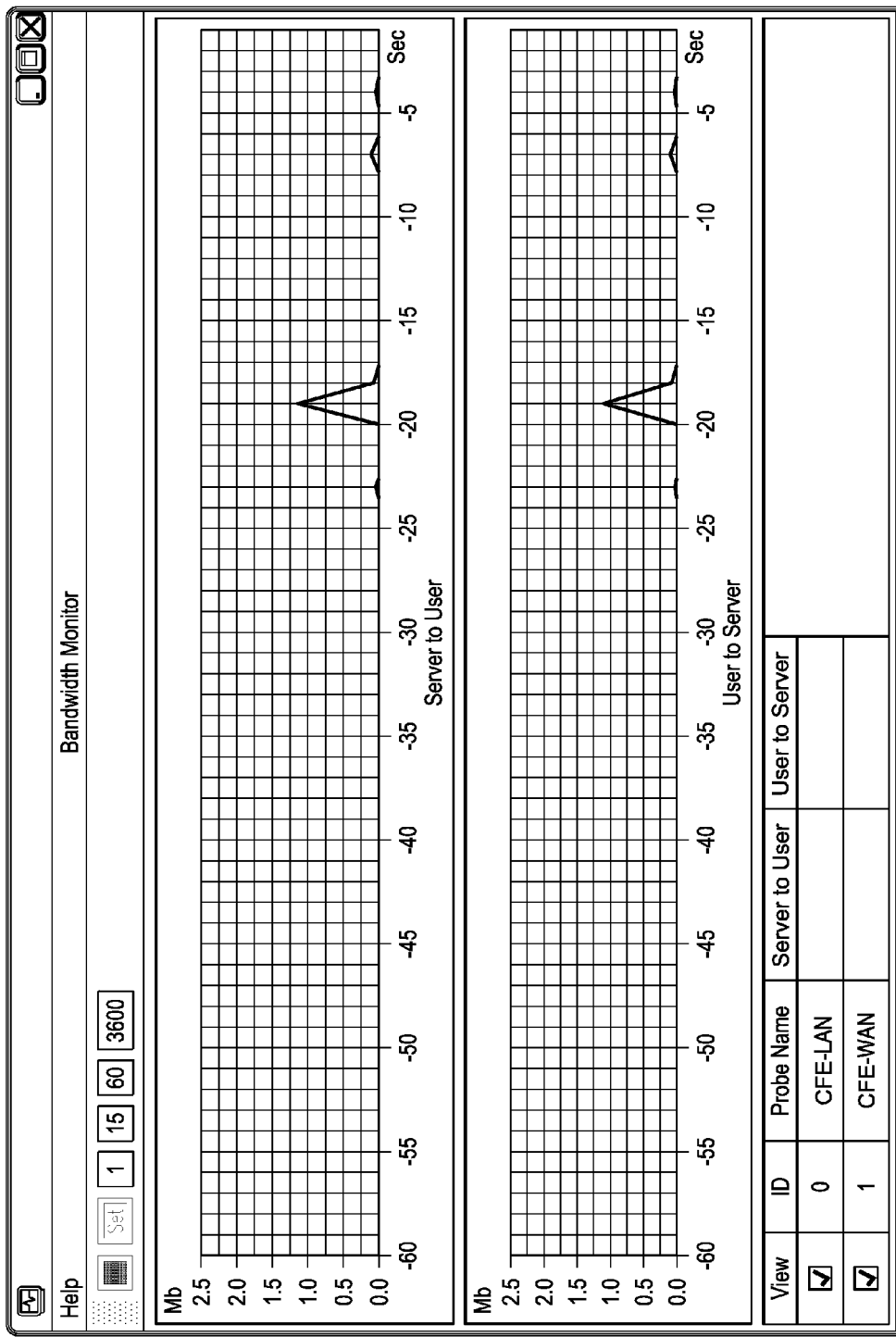

Turning to FIG. 6D, this figure illustrates an example bandwidth monitor 626 that may be included in or with the service monitor 600. The illustrated bandwidth monitor 626 includes real-time dynamic graphical representations of, for example, delivery of a network service over a link. As illustrated, the bandwidth monitor 626 shows a second-by-second real-time display of bandwidth used to deliver a particular network service. The time frame in which the bandwidth is monitored and displayed, however, may be adjustable (e.g., 5 second, less than 1 second, or otherwise). In any event, the bandwidth monitor 626 may display delivery data associated with a number of tasks. For instance, the monitor 626 may monitor and display, in real-time, network traffic measurements such as bandwidth usage, cache hits amount, response time, and other measurements. The monitor 626 may display, for example, measurements per service (e.g., show the real-time bandwidth consumption of a particular network service); per link (e.g., show the real-time bandwidth consumption in a particular link); per appliance (e.g., show the real-time traffic amount which flows through a particular network appliance); or of the network as a whole (e.g., show the real-time bandwidth consumption in all of the links in total).

Figure 7:
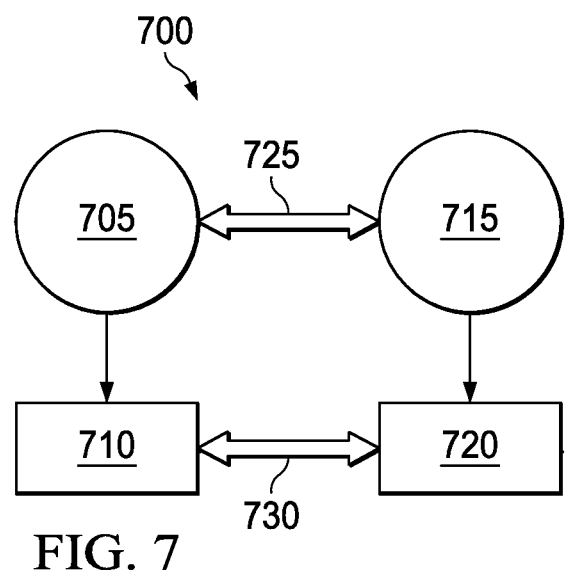
FIG. 7 illustrates a topological representation of an example distributed computing system including an optimizing engine facilitating network synchronization according to the present disclosure.

FIG. 7 illustrates a topological representation of an example distributed computing system 700 including an optimizing engine facilitating network synchronization. The illustrated system 700 shows an SFE 705 including an SFE service monitor interface 710 and a CFE 715 including a CFE service monitor interface 720. Each of the SFE 705 and the CFE 715 may include an optimizing engine facilitating the synchronization of data and configurations between the SFE 705 and CFE 715, as well as the service monitor interfaces 710 and 720. For example, in some aspects, the service monitor interfaces 710 and 720 may be automatically synchronized with no need of manual intervention such that displayed data is synchronized and modifications of network services in both the SFE 705 and the CFE 715 (or servers and/or clients) may occur while keeping both of the SFE 705 and the CFE 715 synchronized with the most updated configurations and data. For example, changes in one service monitor may be reflected to other service monitors in the system 700.

FIGS. 9A-E illustrate example processes 900, 920, 930, 940, and 970 that may be performed by one or more optimizing engines in a distributed computing system. For example, the illustrated processes (and others) may be performed by one or more of the optimizing engines 150a and 150b in the system 100 illustrated in FIG. 1. Further, the illustrated processes may be performed by one or more optimizing engines configured on one or more of the appliances (e.g., CFEs, SFEs, and repositories) illustrated in the distributed computing systems 200, 250, 300, 350, 400, 500, and 700 illustrated in FIGS. 2A-B, 3A-B, 4, 5, and 7, respectively.

Figure 9D:
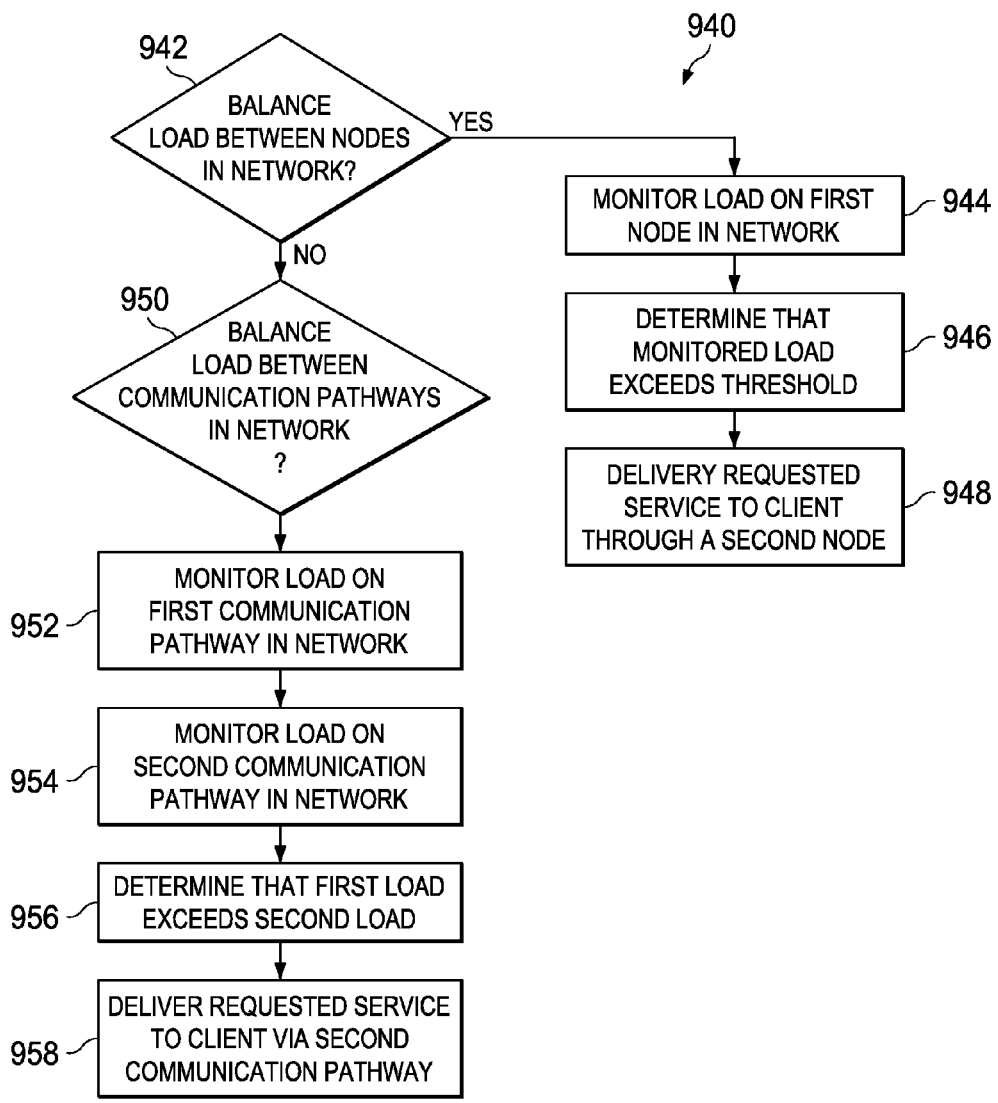

Turning first to FIG. 9A, this figure illustrates an example process 900. Process 900, as illustrated, begins when an appliance (e.g., a CFE) receives a request from a client for a network service at step 902. For instance, an optimizing engine configured on a CFE communicably coupled to the client through a link may receive the request. Next, the optimizing engine may optimize a delivery of the requested network service to the client at step 904. For example, the delivery may be optimized from a server in the system, through an SFE which consumes the service from the server and provides the service to the CFE, and then to the client. During and/or subsequent to step 904, the optimization may include several specific steps 906, 908, and 910. These steps may be executed concurrently or serially, separately or together. In step 906 (and as explained in more detail in FIG. 9B), the optimizing engine on the CFE (or another appliance) may provide a suggested adjustment of an attribute of the distributed network, or system. For instance, the attribute may be associated with the delivery of the network service (e.g., available bandwidth, number of appliances in the network, or otherwise). In step 908 (and as explained in more detail in FIG. 9C), the optimizing engine may bypass a first communication pathway, for example a link within the distributed computing system, to deliver the network service on a second communication pathway. In step 910 (and as explained in more detail in FIG. 9D), the optimizing engine may balance a load, such as a processing or transmission load, among and/or between portions of the distributed computing system between the client and the server. At step 912, the optimizing engine, or another component configured on the CFE, such as a UI, may monitor the execution of the delivery of the network service to the client. Although process 900 illustrates an example in which an optimizing engine on a CFE may perform the process, in some embodiments, any optimizing engine on any appliance in the system may perform one or more steps of the process 900. Further, certain steps of process 900 may be performed by a particular optimizing engine while other steps are performed by other optimizing engine(s).

FIG. 9B illustrates a process 920 that may occur during, as part of, or in addition to step 906 of process 900. In other words, process 920 illustrates an example process that may help or allow the optimizing engine on the CFE (or another appliance) provide a suggested adjustment of an attribute of the distributed network. Process 920 begins with the optimizing engine monitoring the attribute on the distributed network at step 922. For instance, as described above, the optimizing engine (or other component such as a service monitor component of the UI) may keep track of and collect data related to a host of variables, such as, for example, network speed, network resources, number of nodes or components in the network, and so on. Next, the optimizing engine may compare the monitored attribute to a predefined objective, or constraint, in step 924. For example, an administrator of the system may define a constraint such as a maximum number of network services stored on a particular real server. At step 926, the optimizing engine may provide a suggested adjustment of the network to the administrator based on the comparison. For instance, the optimizing engine may suggest that a new real server should be added to store additional and/or existing network services. In some alternate embodiments of process 920, the optimizing engine may automatically and/or dynamically carry out the suggested adjustment without first providing the suggestion. In such embodiments, this mode may be set by an administrator of an appliance in the system.

FIG. 9C illustrates a process 930 that may occur during, as part of, or in addition to step 908 of process 900. In other words, process 930 illustrates an example process that may help or allow the optimizing engine on the CFE (or another appliance) bypass a first communication pathway, for example a link within the distributed computing system, to deliver the network service on a second communication pathway. Process 930 begins with the optimizing engine determining that the network service cannot be delivered to the client on the first communication pathway at step 932. For example, an event in the distributed computing system (as described above) may have occurred, thereby preventing or substantially preventing delivery of the network service via the first communication pathway (e.g., link). Alternatively, while delivery may be accomplished via the first communication pathway, the event may cause such inefficiencies in such a delivery that, for all practical purposes, delivery is prevented on the first communication pathway. Next, at step 934, the optimizing engine identifies the second communication pathway. The second communication pathway may be, for example, an existing link (or links and nodes) communicably coupling the client to the server hosting the requested network service. Alternatively, the second communication pathway may be newly configured prior to its identification, such as in response to a suggestion by the optimizing engine. Further, the optimizing engine may provide for dynamic automatic adjustment, such as, for example, automatically and dynamically adding a needed link in order to provide the network service and/or complete the second communication pathway. Next, at step 936, the requested network service is delivered via the second communication pathway from the server to the client. In some embodiments, the second communication pathway is a bypass link, which bypasses the event in the distributed computing system preventing service delivery on the first communication pathway.

FIG. 9D illustrates a process 940 that may occur during, as part of, or in addition to step 910 of process 900. In other words, process 940 illustrates an example process that may help or allow the optimizing engine on the CFE (or another appliance) balance a load, such as a processing or transmission load, among and/or between portions of the distributed computing system between the client and the server. Process 930 may begin at step 942 in which the optimizing engine (either automatically or in response to a command from the administrator, for example) may determine whether to balance the load between distinct nodes in the distributed computing system. If the optimizing engine determines to balance the load between nodes, the optimizing engine may monitor an amount of network services being delivered through a particular node (e.g., an SFE or CFE or real server) at step 944. The optimizing engine next determines that the monitored load exceeds a threshold value (e.g., automatically generated or provided by the administrator) at step 946. Of course, if the monitored load does not exceed the threshold, network services may be continually delivered through the node. Otherwise, the network service requested by the client is delivered through a second, distinct, node in the system at step 948. Further, in some aspects, requests for network services may be communicated through several nodes of the distributed system, altogether simultaneously, with each node bringing a part of a response to the request to the requesting client.

If the optimizing engine determines not to balance the load between nodes, the optimizing engine may determine whether to balance the load between separate communication pathways at step 950. If the optimizing engine determines to balance the load between communication pathways, the optimizing engine may monitor a load on a first communication pathway in the distributed network at step 952. Next, the optimizing engine may monitor a load on a second communication pathway in the distributed network at step 954 (e.g., among multiple communication pathways in the distributed computing system). The optimizing engine may then determine, at step 956, that the load on the first communication pathway exceeds the load on the second communication pathway. The optimizing engine may then deliver the requested network service to the client via the second communication pathway at step 958. Of course, as described above with respect the balancing loads on system nodes, the optimizing engine may also balance loads on system communication pathways by, for example, comparing the load on a particular pathway to a predetermined (static or dynamically changing) threshold, rather than or in addition to comparing varying loads on different pathways. Further, in some aspects, requests for network services may be communicated through several distinct communication pathways (e.g., links) of the distributed system, altogether simultaneously, with each communication pathway bringing a part of a response to the request to the requesting client.

Figure 9E:
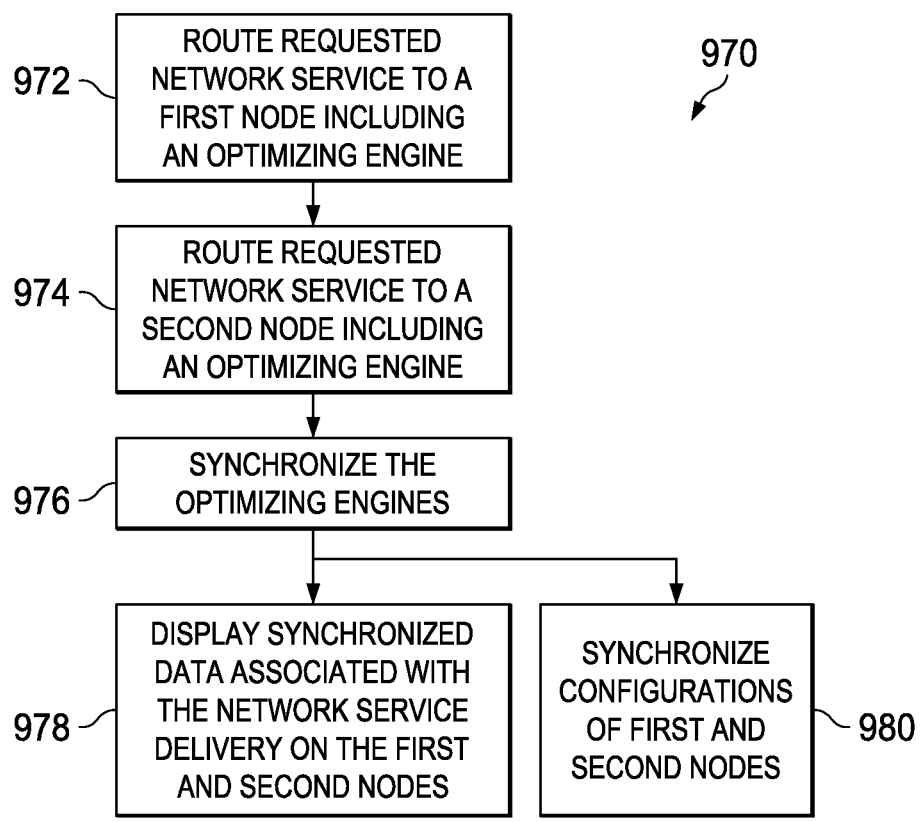

FIG. 9E illustrates another example process 970 that may be performed by one or more optimizing engines and/or other components (e.g., UI or service monitor) of a distributed computing system. Process 970 may begin at step 972 when a requested network service is routed to and/or through a first node of a distributed computing system having an optimizing engine (e.g., an SFE). At step 974, the requested network service is routed to and/or through a second node of a distributed computing system having an optimizing engine (e.g., a CFE). The optimizing engines on the first and second nodes may then be synchronized at step 976. At step 978, synchronized data associated with the network service, the delivery of the network service, and/or other data associated with the network, is displayed through a GUI on the first and second nodes. In other words, the data may match or substantially match, thus allowing administrators at the respective nodes to view matching data. Concurrently, subsequently, or previously to step 978, the configurations of the first and second nodes may be synchronized at step 980. In some aspects, the optimizing engines may automatically be synchronized or be synchronized in response to a command from an administrator of the distributed computing system.

Further, in some aspects, data and/or configuration synchronization may be accomplished through the optimizing engines transmitting data (e.g., an XML file) between each other. The data may contain, for example, a tree structure that describes the configuration of and/or data at each optimizing engine. The data may be unpacked (e.g., from the XML file) and loaded, manipulated, and validated at each node (e.g., using modeled objects and built-in validation functions). Thus, the configurations and data of each optimizing engine on the first and second nodes may be synchronized.

A number of implementations have been described. Nevertheless, it will be understood that various modifications may be made. For example, other processes described herein besides those or in addition to those illustrated in FIGS. 9A-E may be performed. Further, the illustrated steps of processes 900, 920, 930, 940, and 970 may be performed in different orders, either concurrently or serially. Further, steps may be performed in addition to those illustrated in processes 900, 920, 930, 940, and 970, and some steps illustrated in processes 900, 920, 930, 940, and 970 may be omitted without deviating from the present disclosure. Accordingly, other implementations are within the scope of the following claims.

What is claimed is:

1. A computer-implemented method for managing a distributed computer network, the method comprising the following steps performed by one or more processors:
   receiving a request from a client in the distributed computer network for a network service from a server in the distributed computer network;
   identifying a first communication pathway between the client and the server to deliver the requested network service;
   identifying a particular event of a plurality of events in the distributed computer network on the first communication pathway;
   determining that the requested network service is undeliverable through the first communication pathway as a result of the particular event;
   in response to the determining, identifying, from a plurality of responsive actions that are associated with the plurality of events, a particular responsive action associated with the articular event each responsive action of the plurality of responsive actions associated with a different event of the plurality of events;
   in response to identifying the particular responsive action, generating a second communication pathway between the client and the server;
   delivering the requested network service to the client from the server via the second communication pathway including optimizing a delivery of the requested network service to the client from the server by providing a suggested adjustment of at least one attribute of the distributed computer network to an administrator of the network, the providing comprising:
      monitoring the at least one attribute of the distributed computer network, the at least one attribute is a measurement of the delivery of the requested network service;
      comparing the monitored attribute to at least one predefined objective; and
      based on the comparison, providing the suggested adjustment of the distributed computer network to the administrator of the network; and
   monitoring an execution of the delivery of the network service.

2. The computer-implemented method of claim 1, wherein optimizing a delivery of the requested network service to the client from the server further comprises at least one of:
   balancing a load between the client and the server in the distributed computer network;
   bypassing the first communication pathway between the client and the server to deliver the requested network service via the second communication pathway between the client and the server; or
   automatically applying a dynamic adjustment to the distributed computer system.

3. The computer-implemented method of claim 2, wherein the suggested adjustment comprises at least one of:
   a suggestion to add a node to the distributed computer network;
   a suggestion to add a new communication pathway between at least two existing nodes in the distributed computer network; and
   a suggestion to add a new network service available on the distributed computer network;
   a suggestion to modify an existing network service available on the distributed computer network;
   a suggestion to adjust a variable related to the first communication pathway;
   a suggestion to remove one or more nodes from the distributed computer network;
   a suggestion to remove one or more communication pathways from the distributed computer network; and
   a suggestion to remove one or more network services from the distributed computing network.

4. The computer-implemented method of claim 1, wherein comparing the monitored attribute to at least one predefined objective comprises:
   defining an objective function comprising at least one variable representative of the distributed computer network;
   defining at least one constraint on the variable; and
   solving the objective function to determine a value of the variable within the constraint.

5. The computer-implemented method of claim 4, wherein solving the objective function to determine a value of the variable within the constraint comprises:
   solving one of a minimization or a maximization of the objective function to determine the value of the variable within the constraint.

6. The computer-implemented method of claim 4, wherein solving the objective function to determine a value of the variable within the constraint comprises:
   solving the objective function to determine a value of the variable within the constraint using at least one of a linear programming algorithm and an integer programming algorithm.

7. The computer-implemented method of claim 1, wherein the event communicably decouples the client and the server within the first communication pathway, the method further comprising:

determining that the second communication pathway between the client and the server does not include the event; and in response to determining that the second communication pathway between the client and the server does not include the event, establishing the second communication pathway between the client and the server.

8. The computer-implemented method of claim 7, further comprising:
determining that the particular event is within a predefined class of events;
identifying the particular responsive action associated with the predefined class of events; and
initiating the predefined responsive action.

9. The computer-implemented method of claim 8, wherein the particular responsive action comprises at least one of:
establishing the second communication pathway between the client and the server;
notifying an administrator of the distributed computer network of the particular event;
establishing a third communication pathway between the client and a second server; and
providing a suggestion to the administrator to add a fourth communication pathway.

10. The computer-implemented method of claim 9, further comprising:
in response to the provided suggestion, receiving a command to establish the fourth communication pathway; and
establishing the fourth communication pathway between the client and the server in the distributed computer network.

11. The computer-implemented method of claim 7, further comprising:
subsequent to establishing the second communication pathway between the client and the server, determining that the particular event is completed such that the client and the server are communicably coupled within the first communication pathway;
receiving a second request from the client in the distributed computer network for the network service; and
delivering the requested network service to the client from the server via the first communication pathway.

12. The computer-implemented method of claim 2, wherein balancing a load between the client and the server in the distributed computer network comprises:
monitoring the load on a first node in the distributed computer network between the client and the server, the load associated with delivery of network services through the first node;
determining that the load exceeds a predetermined threshold; and
delivering the requested network service from the server to the client through a second node distinct from the first node.

13. The computer-implemented method of claim 2, wherein balancing a load between the client and the server in the distributed computer network comprises:
balancing a load between two or more communication pathways in the distributed computer network.

14. The computer-implemented method of claim 13, wherein balancing a load between two or more communication pathways in the distributed computer network comprises:
monitoring a first load on the first communication pathway between the client and the server;
monitoring a second load on an additional communication pathway between the client and the server, the first and second loads associated with delivery of network services on the respective first communication pathway and additional communication pathway;
determining that the first load exceeds the second load; and
based on the determination, delivering the requested network service from the server to the client via the additional communication pathway.

15. The computer-implemented method of claim 14, wherein the first communication pathway comprises a first server communicably coupled to a first server front end that is communicably coupled to the client, and
the additional communication pathway comprises the first server communicably coupled to a second server front end that is communicably coupled to the client,
wherein delivering the requested network service from the server to the client via the additional communication pathway comprises delivering at least a portion of the requested network service from the first server to the client through the second server front end.

16. The computer-implemented method of claim 15, further comprising:
delivering another portion of the requested network service from the first server to the client through the first server front end substantially simultaneous to delivering the portion of the requested network service from the first server to the client through the second server front end.

17. The computer-implemented method of claim 14, wherein the first communication pathway comprises a first server communicably coupled to a first server front end that is communicably coupled to the client, and
the additional communication pathway comprises a second server communicably coupled to the first server front end that is communicably coupled to the client,
wherein delivering the requested network service from the server to the client via the additional communication pathway comprises delivering at least a portion of the requested network service from the second server to the client through the first server front end.

18. The computer-implemented method of claim 17, further comprising:
delivering another portion of the requested network service from the first server to the client through the first server front end substantially simultaneous to delivering the portion of the requested network service from the second server to the client through the first server front end.

19. The computer-implemented method of claim 1, wherein monitoring an execution of the delivery of the network service comprises:
monitoring, in real-time, a plurality of attributes associated with the execution of the delivery of the network service; and
graphically presenting at least one of the plurality of monitored attributes to an administrator of the distributed computing network.

20. The computer-implemented method of claim 1, wherein monitoring an execution of the delivery of the network service comprises:
routing the request to a first node in the distributed computer network, the first node comprising a first optimizing engine operable to monitor delivery and execution of the requested network service and display a first group of data associated with the delivery and execution of the requested network service through a first user interface;
routing the request to a second node in the distributed computer network, the second node comprising a second optimizing engine operable to monitor delivery and execution of the requested network service and display a second group of data associated with the delivery and execution of the requested network service through a second user interface, the second group of data different than the first group of data; and synchronizing the first optimizing engine with the second optimizing engine such that data displayed on the first user interface matches data displayed on the second user interface.

21. The computer-implemented method of claim 20, further comprising:
identifying a first configuration of the first node;
identifying a second first configuration of the second node; and
synchronizing the first optimizing engine with the second optimizing engine such that the first and second configurations are substantially identical.

22. The computer-implemented method of claim 2, wherein the dynamic adjustment to the distributed computer system comprises at least one of:
adding a node to the distributed computer network;
adding a new communication pathway between at least two existing nodes in the distributed computer network; and
adding a new network service available on the distributed computer network;
modifying an existing network service available on the distributed computer network;
adjusting a variable related to the first communication pathway;
removing one or more nodes from the distributed computer network;
removing one or more communication pathways from the distributed computer network; and
removing one or more network services from the distributed computing network.

23. The computer-implemented method of claim 2, further comprising:
notifying an administrator of the distributed computing system of the dynamic adjustment.

24. An apparatus comprising at least one non-transitory, computer-readable storage medium storing instructions operable, when executed by at least one processor, to perform operations for managing a distributed computer network, the operations comprising:
receiving a request from a client in the distributed computer network for a network service from a server in the distributed computer network;
identifying a first communication pathway between the client and the server to deliver the requested network service;
identifying a particular event of a plurality of events in the distributed computer network on the first communication pathway;
determining that the requested network service is undeliverable through the first communication pathway as a result of the particular event;
in response to the determining, identifying, from a plurality of responsive actions that are associated with the plurality of events, a particular responsive action associated with the particular event, each responsive action of the plurality of responsive actions associated with a different event of the plurality of events;
in response to identifying the predefined responsive action, generating a second communication pathway between the client and the server;

delivering the requested network service to the client from the server via the second communication pathway including optimizing a delivery of the requested network service to the client from the server by providing a suggested adjustment of at least one attribute of the distributed computer network to an administrator of the network, the providing comprising:
monitoring the at least one attribute of the distributed computer network, the at least one attribute is a measurement of the delivery of the requested network service;
comparing the monitored attribute to at least one predefined objective, based on the comparison; and
providing the suggested adjustment of the distributed computer network to the administrator of the network; and
monitoring an execution of the delivery of the network service.

25. The apparatus of claim 24, wherein optimizing a delivery of the requested network service to the client from the server further comprises at least one of:
balancing a load between the client and the server in the distributed computer network;
bypassing the first communication pathway between the client and the server to deliver the requested network service via the second communication pathway between the client and the server; or
automatically applying a dynamic adjustment to the distributed computer system.

26. The apparatus of claim 25, wherein balancing a load between the client and the server in the distributed computer network comprises:
monitoring the load on a first node in the distributed computer network between the client and the server, the load associated with delivery of network services through the first node;
determining that the load exceeds a predetermined threshold;
delivering the requested network service from the server to the client through a second node distinct from the first node.

27. The apparatus of claim 25, balancing a load between the client and the server in the distributed computer network comprises:
balancing a load between two or more communication pathways in the distributed computer network.

28. The apparatus of claim 27, wherein balancing a load between two or more communication pathways in the distributed computer network comprises:
monitoring a first load on the first communication pathway between the client and the server;
monitoring a second load on an additional communication pathway between the client and the server, the first and second loads associated with delivery of network services on the respective first communication pathway and additional communication pathway;
determining that the first load exceeds the second load; and
based on the determination, delivering the requested network service from the server to the client via the additional communication pathway.

29. The apparatus of claim 24, wherein monitoring an execution of the delivery of the network service comprises:
monitoring, in real-time, a plurality of attributes associated with the execution of the delivery of the network service; and graphically presenting at least one of the plurality of monitored attributes to an administrator of the distributed computing network.

30. The apparatus of claim 24, wherein monitoring an execution of the delivery of the network service comprises:
routing the request to a first node in the distributed computer network, the first node comprising a first optimizing engine operable to monitor delivery and execution of the requested network service and display a first group of data associated with the delivery and execution of the requested network service through a first user interface;
routing the request to a second node in the distributed computer network, the second node comprising a second optimizing engine operable to monitor delivery and execution of the requested network service and display a second group of data associated with the delivery and execution of the requested network service through a second user interface, the second group of data different than the first group of data; and
synchronizing the first optimizing engine with the second optimizing engine such that data displayed on the first user interface matches data displayed on the second user interface.

31. The apparatus of claim 30, the operations further comprising:
identifying a first configuration of the first node;
identifying a second first configuration of the second node; and
synchronizing the first optimizing engine with the second optimizing engine such that the first and second configurations are substantially identical.

32. The apparatus of claim 25, wherein the dynamic adjustment to the distributed computer system comprises at least one of:
adding a node to the distributed computer network;
adding a new communication pathway between at least two existing nodes in the distributed computer network; and
adding a new network service available on the distributed computer network;
modifying an existing network service available on the distributed computer network;
adjusting a variable related to the first communication pathway;
removing one or more nodes from the distributed computer network;
removing one or more communication pathways from the distributed computer network; and
removing one or more network services from the distributed computing network.

33. The apparatus of claim 25, the operations further comprising:
notifying an administrator of the distributed computing system of the dynamic adjustment.

* * * * *